(12) United States Patent
Park et al.

(10) Patent No.: US 10,595,085 B2
(45) Date of Patent: Mar. 17, 2020

(54) DISPLAY APPARATUS, SERVER, SYSTEM AND INFORMATION-PROVIDING METHODS THEREOF

(71) Applicant: SAMSUNG ELECTRONICS CO., LTD., Suwon-si, Gyeonggi-do (KR)

(72) Inventors: Dong-min Park, Gwacheon-si (KR); Jong-ho Lea, Seongnam-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/310,884

(22) PCT Filed: May 14, 2015

(86) PCT No.: PCT/KR2015/004818
§ 371 (c)(1),
(2) Date: Nov. 14, 2016

(87) PCT Pub. No.: WO2015/174743
PCT Pub. Date: Nov. 19, 2015

(65) Prior Publication Data
US 2017/0094357 A1 Mar. 30, 2017

(30) Foreign Application Priority Data
May 14, 2014 (KR) .................. 10-2014-0057845

(51) Int. Cl.
*H04N 7/16* (2011.01)
*H04N 21/472* (2011.01)
(Continued)

(52) U.S. Cl.
CPC ......... *H04N 21/472* (2013.01); *G06F 16/583* (2019.01); *H04L 63/104* (2013.01);
(Continued)

(58) Field of Classification Search
None
See application file for complete search history.

(56) References Cited

U.S. PATENT DOCUMENTS 9,116,645 B1* 8/2015 Klappert .......... H04N 21/42201
2009/0133051 A1* 5/2009 Hildreth .............. H04N 5/4403
725/28
(Continued)

FOREIGN PATENT DOCUMENTS

CN 103369391 10/2013
WO 2009/067670 5/2009

OTHER PUBLICATIONS

International Search Report for PCT/KR2015/004818, dated Aug. 13, 2015, 2 pages.
(Continued)

*Primary Examiner* — William J Kim
(74) *Attorney, Agent, or Firm* — Nixon & Vanderhye, P.C.

(57) ABSTRACT

Disclosed are a display apparatus, a server, a system and information providing methods thereof, in which the display apparatus can provide personalization or grouping information optimized to a changed individual or group without substantive authentication and login procedures for a user even though the individual or group using the corresponding apparatus is changed, The display apparatus includes: a display configured to display an image; a communicator configured to communicate with a server; a user recognizer configured to acquire recognition information about a user; a storage configured to store reference recognition information for determining whether the user is a server user having relation with the display apparatus; and a controller configured to determine the server user corresponding to the user by comparing the recognition information about the user acquired by the user recognizer with the reference recogni-
(Continued)

tion information stored in the storage, request and receive server information including personalization information of the determined server user from the server, and display requested information on the display based on the received server information when the user makes a request for the information.

20 Claims, 30 Drawing Sheets

(51) Int. Cl.
| | | |
|---|---|---|
| *G06F 16/583* | (2019.01) | |
| *H04N 21/2668* | (2011.01) | |
| *H04N 21/4415* | (2011.01) | |
| *H04N 21/658* | (2011.01) | |
| *H04N 21/475* | (2011.01) | |
| *H04L 29/06* | (2006.01) | |
| *H04N 21/231* | (2011.01) | |
| *H04N 21/25* | (2011.01) | |
| *H04N 21/254* | (2011.01) | |
| *H04N 21/45* | (2011.01) | |
| *H04N 21/4788* | (2011.01) | |

(52) U.S. Cl.
CPC ......... *H04N 21/231* (2013.01); *H04N 21/252* (2013.01); *H04N 21/2541* (2013.01); *H04N 21/2668* (2013.01); *H04N 21/4415* (2013.01); *H04N 21/4532* (2013.01); *H04N 21/4751* (2013.01); *H04N 21/4753* (2013.01); *H04N 21/4788* (2013.01); *H04N 21/6582* (2013.01)

(56) References Cited

U.S. PATENT DOCUMENTS

| | | | |
|---|---|---|---|
| 2009/0138805 A1* | 5/2009 | Hildreth | G06K 9/00335 715/745 |
| 2009/0164568 A1 | 6/2009 | Kim et al. | |
| 2011/0185437 A1 | 7/2011 | Tran et al. | |
| 2011/0209214 A1* | 8/2011 | Simske | G06F 21/32 726/21 |
| 2011/0277003 A1 | 11/2011 | Xiong et al. | |
| 2012/0167123 A1 | 6/2012 | Gavita | |
| 2013/0055348 A1* | 2/2013 | Strauss | G06F 21/31 726/3 |
| 2013/0067546 A1* | 3/2013 | Thavasi | G06F 21/31 726/7 |
| 2013/0219518 A1 | 8/2013 | Sambamurthy et al. | |
| 2013/0329966 A1 | 12/2013 | Hildreth | |
| 2014/0026157 A1 | 1/2014 | Wang et al. | |
| 2014/0075339 A1 | 3/2014 | Weskamp et al. | |
| 2014/0172915 A1* | 6/2014 | Herbach | H04L 63/105 707/781 |

OTHER PUBLICATIONS

Extended European Search Report dated Nov. 24, 2017 in EP Application No. 15793369.8.
Communication pursuant to Article 94(3) EPC dated Sep. 20, 2018 in counterpart EP Application No. 15793369.8.
Notification of the First Office Action dated Jan. 16, 2019 in counterpart Chinese Patent Application No. 201580036979.0 and English-language machine translation.
Summons to attend oral proceedings pursuant to Rule 115(1) EPC in counterpart European Patent Application No. 15793369.8.
Decision to refuse a European Patent application dated Oct. 10, 2019 in counterpart European Patent Application No. 15793369.8.

* cited by examiner

FIG. 18

$$\boxed{\begin{array}{c}\text{AUTHORITY}\\\text{OF}\\\text{APPARATUS}\end{array}} \cap \left( \boxed{\begin{array}{c}\text{AUTHORITY}\\\text{OF USER 1}\\\text{IN GROUP}\end{array}} \cup \boxed{\begin{array}{c}\text{AUTHORITY}\\\text{OF USER 2}\\\text{IN GROUP}\end{array}} \cup \cdots \right)$$

BASEBALL?

FATHER: LIKING(=1)

MOTHER: DISLIKING(=0)   MINIMUM    DISLIKING(=0)

SON: LIKING(=1)

BASEBALL?

| FATHER: LIKING(=1) |

| MOTHER: DISLIKING(=0) |   MAXIMUM    | LIKING(=1) |

| SON: LIKING(=1) |

FIG. 24

| FATHER'S PRIMARY BROWSING | =1 | MOTHER'S PRIMARY BROWSING | =1 | SON'S PRIMARY BROWSING | =1 |
| --- | --- | --- | --- | --- | --- |
| FATHER'S SECONDARY BROWSING | =0.9 | MOTHER'S SECONDARY BROWSING | =0.9 | SON'S SECONDARY BROWSING | =0.9 |
| FATHER'S TERTIARY BROWSING | =0.8 | MOTHER'S TERTIARY BROWSING | =0.8 | SON'S TERTIARY BROWSING | =0.8 |

DISPLAY APPARATUS, SERVER, SYSTEM AND INFORMATION-PROVIDING METHODS THEREOF

This application is the U.S. national phase of International Application No. PCT/KR2015/004818 filed 14 May 2015, which designated the U.S. and claims priority to KR Patent Application No. 10-2014-0057845 filed 14 May 2014, the entire contents of each of which are hereby incorporated by reference.

TECHNICAL FIELD

Apparatuses and methods consistent with the exemplary embodiments relate to a display apparatus, and more particularly to a display apparatus, a server, a system and information providing methods thereof, in which the display apparatus can provide personalization or aggregation information optimized to a changed individual or group without substantive authentication and login procedures for a user even though the individual or group using the corresponding apparatus is changed.

BACKGROUND ART

With development of electronic communication industry, an electronic device, for example, a digital television (TV) or the like display apparatus has been gradually developed as an intelligent device having multiple functions such as Internet communication and information search in addition to its original functions.

For example, a display apparatus, for example, a smart TV capable of accessing Internet and receiving multimedia contents including video/audio data and packet data has been achieved to provide a personalization function by which Internet communication, information search and the like functions provided by the apparatus are personalized and managed according to users.

Such a display apparatus having the personalization function provides users, who employ this apparatus, with user accounts for personalization individually designated to them, and thus allows users to use the functions of the display apparatus. Therefore, a certain user has to be authenticated to log in to the display apparatus with his/her account.

For the user authentication, there have been generally used a face recognition method using a camera, a voice print recognition method using a microphone, a finger print recognition method using a fingerprint recognition device, a method of inputting a user authenticode such as identification (ID) and a password, and so on.

In accordance with the user authentication, the display apparatus with the personalization function allows the authenticated user to log in to a corresponding user account and thus use his/her contents previously personalized by him/her.

Such a conventional display apparatus with the personalization function may be frequently used by a plurality of users at the same time since it is shared by the plurality of users.

However, there has not been hitherto developed a display apparatus which allows a plurality of users to log in as a group and manages its functions according to groups.

Therefore, the conventional display apparatus with the personalization function cannot offer a content optimized for a group including a plurality of users to the corresponding group when it is simultaneously used by the plurality of users at the same time.

To solve this problem, a joint account may be assigned and used for the plurality of users.

However, in this case, users who employ the display apparatus with the personalization function are often changed, and it is thus impossible to provide contents optimized for a group of changed users to the corresponding group whenever users are changed.

Also, in case that the conventional display apparatus with the personalization function employs the face or voice print recognition method for the user authentication, which has a poor recognition rate, it is impossible to log in for users to the user account or the joint account due to a recognition error, even though the users have already been registered thereto.

Also, the conventional display apparatus with the personalization function by itself can not subscribe to an information providing server such as a social network service (SNS) server providing a SNS and create a user account thereof. Accordingly, users of, for example, mobile devices such as hand phones can not make an information sharing relation such as a friend or the like with the conventional display apparatus to shares various pieces of information or various functions therewith based on the information sharing relation through the SNS of the information providing server.

DISCLOSURE OF INVENTION

Technical Problem

One or more exemplary embodiments may provide a display apparatus, a server, a system and information providing methods thereof, in which the display apparatus can provide personalization or aggregation information optimized to a changed individual or group without substantive authentication and login procedures for a user even though the individual or group using the corresponding apparatus is changed.

Another exemplary embodiment may provide a display apparatus, a server, a system and information providing methods thereof, in which the display apparatus can provide personalization or aggregation information differentiated in accordance with accuracy of user recognition to an individual or group even though a user using the corresponding apparatus is misrecognized.

Another exemplary embodiment may provide a display apparatus, a server, a system and information providing methods thereof, in which the display apparatus by itself can subscribe to an information providing server such as a SNS server and create a user account thereof, thereby allowing the display apparatus to share various pieces of information or various functions with other users of the information providing server.

Solution to Problem

In accordance with an exemplary embodiment, there is provided a display apparatus including a display configured to display an image, a communicator configured to communicate with a server, a user recognizer configured to acquire recognition information about a user, a storage configured to store reference recognition information for determining whether the user is a server user having relation with the display apparatus, and a controller configured to determine the server user corresponding to the user by comparing the recognition information about the user acquired by the user recognizer with the reference recognition information stored in the storage, request and receive server information including personalization information of the determined server user from the server, and display requested information on the display based on the received server information when the user makes a request for the information.

The server may include a social network service (SNS) providing server that allows information to be shared between the server users and between the server users and the display apparatus.

The user recognizer may include a camera photographing an image including a face image of a user, and/or a microphone for receiving sound of the user.

The reference recognition information may be provided from the server and stored in the storage, under control of the controller or in response to a request of a user.

According to an embodiment, the controller may perform control to classify a user into one among a plurality of server user grades previously set up with respect to accuracy of user determination, i.e., with respect to a matching rate between the user recognition information acquired by the user recognizer and the reference recognition information stored in the storage, request and receive server information including personalization information of the determined server user to and from the server, generate a plurality of individual profiles including profile information for differentiating an access of the user to the received server information in accordance with the plurality of server user grades, based on the received server information, and display requested information based on an individual profile corresponding to the classified one among the plurality of server user grades when the user makes a request for the information.

The plurality of server user grades may include a definite server user having the matching rate equal to or higher than a first rate, and a general user having the matching rate lower than the first rate.

The first rate may include 95%.

The plurality of individual profiles may include a server user profile including profile information about all personalization information of the determined server user, and a general user profile including profile information about personalization information opened by the determined server user to all other server users among the personalization information of the determined server user.

Alternatively, the plurality of server user grade may include a definite server user having the matching rate equal to or higher than a first rate, a reliable server user having the matching rate ranging from a second rate to the first rate, a potential server user having the matching rate ranging from a third rate to the second rate, and a general user having the matching rate lower than the third rate.

At this time, the first to third rates may include 95%, 80% and 50%, respectively.

The plurality of individual profiles may include a first server user profile including profile information about all personalization information of the determined server user, a second server user profile including profile information about the personalization information except first security information of the determined server user among the personalization information of the determined server user, a third server user profile including profile information about the personalization information except the first security information and second security information of the determined server user among the personalization information of the determined server user, and a general user profile including profile information about personalization information opened by the determined server user to all other server users among the personalization information of the determined server user.

According to another embodiment, the user recognizer may acquire recognition information about a plurality of users.

At this time, the storage may store a plurality of pieces of reference recognition information for determining whether the plurality of users are respectively server users related to the display apparatus.

Also, the controller may determine the server users corresponding to the plurality of users by comparing the recognition information of the plurality of users acquired by the user recognizer with the plurality of pieces of reference recognition information stored in the storage, request and receive server information including personalization information of the determined server users to and from the server, generate a group profile including profile information for differentiating an access of a group of the plurality of users to the received server information of the server users in accordance with authority of the determined server users, based on the received server information of the server users, and display requested information on the display based on the generated group profile when one among the plurality of users makes a request for the information.

At this time, if the accuracy of the user determination, i.e., the matching rate between the user recognition information and the reference recognition information is equal to or higher than a first rate, the controller may determine a corresponding user as the server user. Here, the first rate may include 95%.

Also, the controller generates a group profile including profile information that further differentiates the access of the group of the plurality of users to the received server information of the server users in accordance with server user grades and item security classification based on accuracy of user determination.

In this case, the server user grade may include a definite server user having the matching rate between the user recognition information and the reference recognition information equal to or higher than the first rate, a reliable server user having the matching rate ranging from a second rate to the first rate, a potential server user having the matching rate ranging from a third rate to the second rate, and a general user having the matching rate lower than the third rate. At this time, the first to third rates may include 95%, 80% and 50%, respectively.

The item security classification may include a first security item to which the definite server user can have an access, a second security item to which the definite server user and the reliable server user can have an access, a third security item to which the definite server user, the reliable server user and the potential server user can have an access, and a general item to which any user can have an access.

Also, the controller may generate a group profile including profile information that further differentiates the access of the group of the users to the received server information of the server users in accordance with a user preference and/or a user characteristic.

Also, the controller may exclude the personalization information including contents that has not to be opened to any one of the current users, i.e., do not satisfy an open condition, before the requested information is displayed on the display based on the generated group profile.

The controller may receive, from the server, the personalization information searched by the server based on personalization data of the determined server user, or the server information including the individual profile and/or the group profile including the profile information of the determined server user generated based on the searched personalization information.

In accordance with another exemplary embodiment, there is provided a display apparatus including a display configured to display an image, a communicator configured to communicate with a server, a user recognizer configured to acquire recognition information about a user, a storage configured to store reference recognition information for determining the user, and a controller configured to determine the user by comparing the recognition information about the user acquired by the user recognizer with the reference recognition information stored in the storage, classify the user into one among a plurality of user grades previously set up with respect to accuracy of user determination, request and receive server information about the determined user to and from the server, generate a plurality of individual profiles including profile information respectively optimized for the plurality of user grades based on the received server information of the user, and display requested information based on an individual profile corresponding to the classified one among the plurality of server user grades when the user makes a request for the information.

The reference recognition information may include reference recognition information for determining whether the user is a server user having relation with the display apparatus, and the controller may generate the plurality of individual profiles including the profile information for differentiating an access of the user to the received server information of the server user based on the received server information of the server user.

The accuracy of user determination may include a matching rate between the user recognition information acquired by the user recognizer and the reference recognition information stored in the storage.

In accordance with still another exemplary embodiment, there is provided a display apparatus including a display configured to display an image, a communicator configured to communicate with a server, a user recognizer configured to acquire recognition information about a user, and a controller configured to transmits the recognition information about the user acquired by the user recognizer to the server so that the server can determine a server user corresponding to the user, request and receive server information including personalization information of the determined server user to and from the server, and display requested information on the display based on the received server information when the user makes a request for the information.

In accordance with still another exemplary embodiment, there is provided an information providing method of a display apparatus, the method including acquiring recognition information about at least one user, determining a server user corresponding to the user by comparing the acquired recognition information about the user with reference recognition information for determining whether the user is the server user having relation with the display apparatus, requesting and receiving server information including personalization information of the determined server user to and from the server, and displaying requested information based on the received server information when the user makes a request for the information.

The information providing method of the display apparatus may further include receiving and storing the reference recognition information from the server.

The acquiring includes acquiring image data including a face image of a user, and/or sound data including sound of the user.

According to an embodiment, the determining may include classifying the user into one among a plurality of server user grades previously set up with respect to accuracy of user determination. The accuracy of user determination may include a matching rate between the acquired user recognition information and the stored reference recognition information.

The classifying may include classifying the user into a definite server user having the matching rate equal to or higher than a first rate, and a general user having the matching rate lower than the first rate. The first rate may include 95%.

Alternatively, the classifying may include classifying the user into a definite server user having the matching rate equal to or higher than a first rate, a reliable server user having the matching rate ranging from a second rate to the first rate, a potential server user having the matching rate ranging from a third rate to the second rate, and a general user having the matching rate lower than the third rate. The first to third rates may include 95%, 80% and 50%, respectively.

The displaying may include generating a plurality of individual profiles including profile information for differentiating an access of the user to the received server information of the server user in accordance with the plurality of server user grades based on the received server information of the server user, and displaying requested information based on an individual profile corresponding to the classified one among the plurality of server user grades when the user makes a request for the information.

The generating may include generating a server user profile including profile information about all personalization information of the determined server user, and a general user profile including profile information about personalization information opened by the determined server user to all other server users among the personalization information of the determined server user.

Alternatively, the generating may include generating a first server user profile including profile information about all personalization information of the determined server user, a second server user profile including profile information about the personalization information except first security information of the determined server user among the personalization information of the determined server user, a third server user profile including profile information about the personalization information except the first security information and second security information of the determined server user among the personalization information of the determined server user, and a general user profile including profile information about personalization information opened by the determined server user to all other server users among the personalization information of the determined server user.

According to another embodiment, the acquiring may include acquiring recognition information about a plurality of users. The storing may include storing a plurality of pieces of reference recognition information for determining whether the plurality of users are respectively server users related to the display apparatus. The determining may include determining the server users corresponding to the plurality of users by comparing the acquired recognition information of the plurality of users with the stored corresponding reference recognition information. The receiving may include requesting and receiving server information including personalization information of the determined server users to and from the server. The displaying may include generating a group profile including profile information for differentiating an access of a group of the plurality of users to the received server information of the server users in accordance with authority of the determined server users, based on the received server information of the server users, and displaying requested information on the display based on the generated group profile when one among the plurality of users makes a request for the information.

At this time, the determining may include determining a corresponding user as the server user if the matching rate between the user recognition information and the reference recognition information is equal to or higher than a first rate. Here, the first rate may include 95%.

The generating may include generating a group profile including profile information that further differentiates the access of the group of the plurality of users to the received server information of the server users in accordance with server user grades and item security classification based on accuracy of user determination. In this case, the server user grade may include a definite server user having the matching rate between the user recognition information and the reference recognition information equal to or higher than the first rate, a reliable server user having the matching rate ranging from a second rate to the first rate, a potential server user having the matching rate ranging from a third rate to the second rate, and a general user having the matching rate lower than the third rate. At this time, the first to third rates may include 95%, 80% and 50%, respectively. The item security classification may include a first security item to which the definite server user can have an access, a second security item to which the definite server user and the reliable server user can have an access, a third security item to which the definite server user, the reliable server user and the potential server user can have an access, and a general item to which any user can have an access.

Also, the generating may include generating a group profile including profile information that further differentiates the access of the group of the users to the received server information of the server users in accordance with a user preference and/or a user characteristic.

The displaying include excluding the personalization information including contents that has not to be opened to any one of the current users, i.e., do not satisfy an open condition, before the requested information is displayed on the display based on the generated group profile.

The receiving may include receiving one of the personalization information searched by the server based on the personalization data of the determined server user, and the individual profile and/or the group profile including the profile information of the determined server user generated based on the personalization information.

In accordance with still another exemplary embodiment, there is provided a server including a communicator configured to communicate with a display apparatus, and a controller configured to provide a social network service (SNS) allowing information to be shared between server users and between the server users and the display apparatus, collect server information of the server user as the display apparatus requests the server information including personalization information about the server user through the communicator, and provides the collected server information to the display apparatus.

The controller may transmit reference recognition information, which is for determining whether a user of the display apparatus is the server user having relation with the display apparatus, to the display apparatus in response to a request of the display apparatus.

The controller may determine whether information sharing relation has been set up between the display apparatus and the server user based on individual information of the user received from the display apparatus when receiving the request for the server information from the display apparatus, collects the server information of the server user if it is determined that the information sharing relation has been set up, and transmits the collected server information to the display apparatus. At this time, the controller may send the display apparatus and/or a portable terminal of the server user, a check message notifying that the information sharing relation has not been set up or the server user does not subscribe to the server if it is determined that the information sharing relation has not been set up so that the check message can be displayed on the display apparatus and/or the portable terminal.

Also, the controller may generate an individual profile and/or a group profile including the personalization information of the searched server user based on the personalization data of the server user received from the display apparatus. At this time, the controller transmits the individual profile and/or the group profile to the display apparatus when receiving the request for the server information from the display apparatus.

In accordance with still another exemplary embodiment, there is provided a server including a communicator configured to communicate with a display apparatus, a storage configured to store reference recognition information for determining whether a user of the display apparatus is a server user, and a controller configured to provide a social network service (SNS) allowing information to be shared between server users and between the server users and the display apparatus, determine the server user corresponding to the user by comparing recognition information about the user received from the display apparatus through the communicator with the reference recognition information stored in the storage, generate server information including personalization information of the determined server user, and transmits the generated server information to the display apparatus through the communicator.

In accordance with still another exemplary embodiment, there is provided an information providing method of a server, the method including receiving personal information and personalization data of a server user, along with a request for server information including personalization information about the server user, from the display apparatus, and collecting and transmitting server information of the server user based on the received personal information and personalization data to the display apparatus.

The image providing method of the server may further include sending the display apparatus, reference recognition information for determining whether a user of the display apparatus is the server user having relation with the display apparatus in response to a request of the display apparatus.

The transmitting may include determining whether information sharing relation between the display apparatus and the server user has been set up; and collecting and transmitting the server information including the personalization information of the server user to the display apparatus if it is determined that the information sharing relation has been set up. At this time, the transmitting may include sending the display apparatus and/or a portable terminal of the server user, a check message notifying that the information sharing relation has not been set up or the server user does not subscribe to the server if it is determined that the information sharing relation has not been set up so that the check message can be displayed on the display apparatus and/or the portable terminal.

Also, the image providing method of the server may include searching the personalization information about the server user based on the personalization data of the server user received from the display apparatus, and generating an individual profile and/or a group profile including the profile information of the server user based on the personalization information of the searched server user. At this time, the transmitting may include transmitting the individual profile and/or the group profile to the display apparatus when receiving the request for the server information from the display apparatus.

In accordance with still another exemplary embodiment, there is provided a system including the foregoing display apparatus configured to display an image, and the foregoing server configured to provide information to the display in response to a request from the display apparatus.

In accordance with still another exemplary embodiment, there is provided an information providing method of a system including a display apparatus and a server, the method including: by the display apparatus, acquiring recognition information about a user; by the display apparatus, determining a server user corresponding to the user by comparing the acquired user recognition information with reference recognition information for determining whether the user is the server user set up to have information sharing relation with the display apparatus; by the display apparatus, requesting server information including personalization information about the determined server user from the server; by the server, collecting and transmitting the server information about the determined server user to the display apparatus; and by the display apparatus, displaying requested information based on the server information received from the server when the display apparatus requests the information about the user.

The image providing method of the system may further include, by the display apparatus, requesting and receiving the reference recognition information from the server, and storing the received reference recognition information.

The collecting and transmitting may include, by the server, collecting the server information of the determined server user based on the personalization data of the determined server user received from the display apparatus, and transmitting the collected server information to the display apparatus. At this time, the transmitting to the display apparatus may include determining whether information sharing relation has been set up between the display apparatus and the server user, and collecting the server information including the personalization information of the determined user if it is determined that the information sharing relation has been set up and transmitting the collected server information to the display apparatus. Also, the transmitting to the display apparatus may further include sending the display apparatus and/or a portable terminal of the determined user a check message notifying that the information sharing relation has not been set up or the determined server user does not subscribe to the server if it is determined that the information sharing relation has not been set up, so that the check message can be displayed on the display apparatus and/or the portable terminal.

The displaying may include, by the display apparatus, generating an individual profile and/or a group profile including the profile information optimized for the determined server user based on the server information of the received server user, and displaying requested information based on the generated individual profile and/or group profile when receiving the request for the information about the user.

Alternatively, the transmitting may include, by the server, searching the personalization information of the determined server user based on personalization data received from the display apparatus, and by the server, generating and transmitting an individual profile and/or a group profile including the profile information of the determined server user from the personalization information of the searched server user to the display apparatus.

The displaying may include, by the display apparatus, receiving the individual profile and/or the group profile from the server, and displaying requested information based on the received individual profile and/or group profile when the user requests the information.

In accordance with still another exemplary embodiment, there is provided a system including: a display apparatus including a display configured to display an image, a first communicator configured to communicate with a server, and a first controller configured to request and receive server information from the server through the first communicator and display requested information on the display based on the server information received when a user requests the information; and a server including a second communicator configured to communicate with the first communicator of the display apparatus, and a second controller configured to provide a social network service (SNS) allowing information to be shared between server users and between the server users and the display apparatus and collect and provide server information to the display apparatus when receiving a request for the server information from the display apparatus through the second communicator.

In accordance with still another exemplary embodiment, there is provided a system including: a display apparatus including a display configured to display an image; a first communicator configured to communicate with a server; a user recognizer configured to acquire recognition information about a user; a storage configured to store the reference recognition information for determining the user; and a controller configured to determine the user by comparing the user recognition information acquired by the user recognizer with the reference recognition information stored in the storage and at the same time classify the user into one among a plurality of user grades previously set up with reference to accuracy of user determination, request and receive server information about the determined user from the server through the first communicator, generate a plurality of individual profiles including profile information respectively optimized for the plurality of users grades based on the received server information of the user, and display requested information on the display based on the individual profile corresponding to one among the plurality of classified users grades when the user requests the information, and a server including a second communicator configured to communicate with the first communicator of the display apparatus; and a second controller configured to collect and provide server information to the display apparatus when receiving a request for the server information from the display apparatus through the second communicator.

BRIEF DESCRIPTION OF DRAWINGS

The above and/or other aspects will become apparent and more readily appreciated from the following description of exemplary embodiments, taken in conjunction with the accompanying drawings, in which:

FIGS. 17 to 20 are views showing a method of reflecting personalization information related to the authority of current users when a group profile is created according to an exemplary embodiment;

FIGS. 21 to 25 are views showing a method of reflecting personalization information related to preference and/or characteristic of the current users when a group profile is created according to an exemplary embodiment;

BEST MODE FOR CARRYING OUT THE INVENTION

Below, a display apparatus, a server, a system and information providing methods thereof, according to exemplary embodiments will be described with reference to accompanying drawings.

Figure 1:
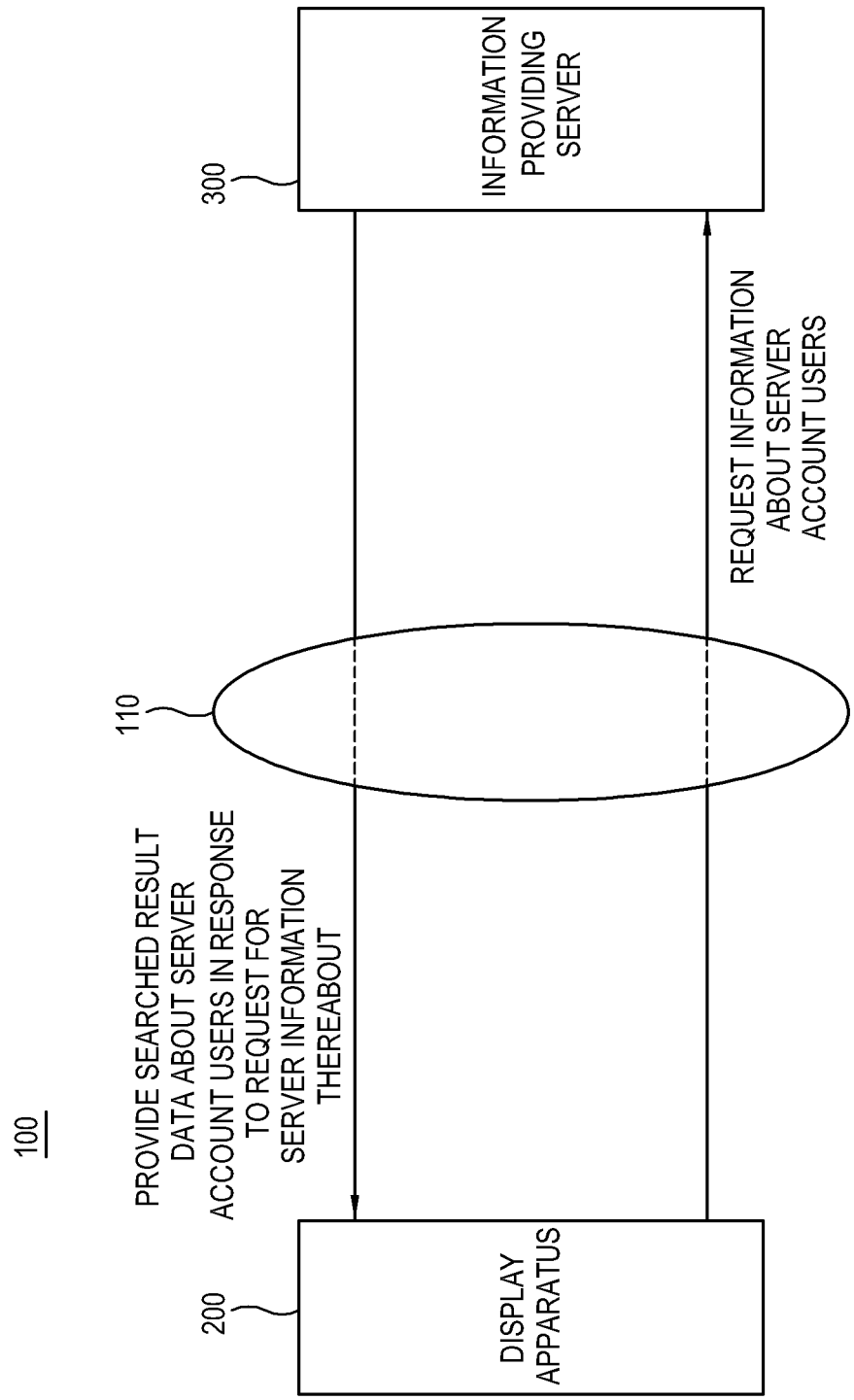
FIG. 1 is a block diagram showing a display system including a display apparatus and an information providing server according to an exemplary embodiment.

FIG. 1 is a block diagram showing a display system 100 including a display apparatus 200 and an information providing server 300 according to an exemplary embodiment;

According to an exemplary embodiment, the display apparatus 200 and the information providing server 300 are connected to each other through a network 110.

The network 110 includes a device or infrastructure used in performing communication to exchange information about a user's input and an information providing service. For example, the network 110 may be a wired and/or wireless network such as Internet or the like.

Figure 2:
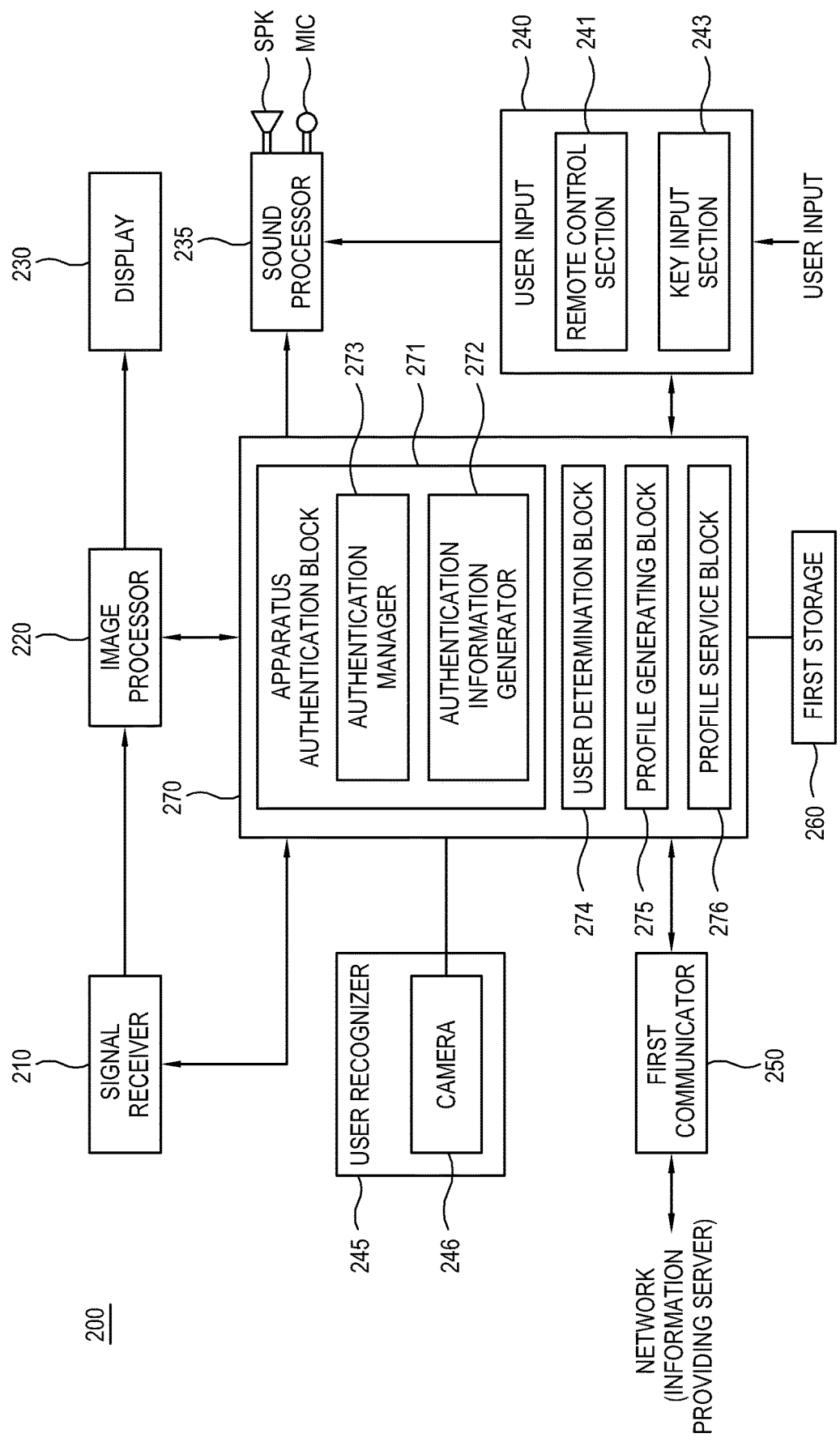
FIG. 2 is a block diagram of the display apparatus according to an exemplary embodiment applied to the display system of FIG. 1.

FIG. 2 is a block diagram of the display apparatus 200 according to an exemplary embodiment.

The display apparatus 200 according to an exemplary embodiment is an apparatus that provides personalization or aggregation information optimized to a changed individual or group without substantive authentication and login procedures for a user even though the individual or group using the corresponding apparatus is changed. For example, the display apparatus 200 may include a smart television (TV), an Internet protocol (IP) TV or the like apparatus capable of displaying an image.

The display apparatus 200 has a wired/wireless communication function to receive information from the information providing server 300 or the like outside through the network 110, and thus an application may be received and installed therein. Here, a content refers to any content that can be displayed, reproduced and executed in the display apparatus 100 like a broadcasting signal, a text, a moving image, a photograph, a movie, music, etc. The application refers to a typical application program that can perform reproducing and editing the content, a game, navigation, an electronic dictionary, social network service (SNS), etc. The display apparatus 200 may have an operating system such as Windows, Linux, Android, Bada, etc.

Below, the smart TV will be described as an example of the display apparatus 200.

Referring to FIG. 2, the display apparatus 200 includes a signal receiver 210, an image processor 220, a display 230, a sound processor 235, a user input 240, a user recognizer 245, a first communicator 250, a first storage 260 and a first controller 270.

The signal receiver 210 may receive an image signal included in a broadcasting signal transmitted from a broadcasting signal transmitter (not shown), an image signal from an image device such as a digital versatile disc (DVD) player, a blu-ray disc (BD) player, etc., an image signal from a personal computer (PC), an image signal from Internet or the like network, and an image content stored in a universal serial bus (USB) storage medium or the like storage medium as an image signal.

The image processor 220 processes the image signal received by the signal receiver 210 and displays it as an image. The image processor 220 may have functions of decoding, image enhancement, scaling, etc.

The display 230 displays an image based on the image signal processed by the image processor 220. There is not limit to a type of displaying an image through the display 230, including a liquid crystal display (LCD), a plasma display panel (PDP), an organic light emitting diode (OLED), etc.

The sound processor 235 processes a sound signal separated by a demultiplexer (not shown) from the broadcasting signal received from the signal receiver 210, under control of the first controller 270, and outputs the processed sound signal to a speaker SPK.

Also, when a microphone MIC along with a camera 246 are used as an element of a user recognizer 245 as will be described, the sound processor 235 is controlled by a user determination block 274 of the first controller 270 (to be described later), and thus converts a sound signal received from the microphone MIC into sound data through modulation.

The user input 240 receives a user's command. A user's command includes information for allowing the display apparatus 200 to perform a predetermined operation determined by a user's behavior or the like. Here, the predetermined operation may include an operation for controlling a basic function of the display apparatus 200 such as power on/off, volume control, etc., and an operation for inputting settings and various executing commands needed for executing a firmware, an operating system and an ASIC section to be described later, stored in the first storage 260. Such a user's command may include a remote control section signal received through control of the remote control section 241, and a key input signal received through the key input unit 243.

The remote control section 241 may include a remote controller (not shown) including input keys or buttons, and a remote control signal receiver (not shown) for receiving a remote control signal involving key input information corresponding to a user's input. The remote control signal receiver transmits the remote control signal received from the remote controller to the first controller 270. The first controller 270 controls the corresponding functions and/or elements in response to the remote control signal.

The key input unit 243 includes the input keys or buttons formed in a front lower side or lateral side of a case (not shown) of the display apparatus 200. The key input unit 243 generates a key signal related to function control of the display apparatus 200 in accordance with a user's input through the input key or buttons, and transmits the generated key signal to the first controller 270. The key signal includes a power on/off signal, a volume control signal, etc. The first controller 270 controls the corresponding function and/or elements in response to the key signal input by the key input unit 243.

Also, the user input 240 may further include a cellular phone, a personal digital assistant (PDA), a tablet PC or the like portable terminal (not shown) paired with the display apparatus 200 through authentication of device and user in the display apparatus 200.

The user recognizer 245 acquires recognition information of a user who is using the display apparatus 200.

The user recognizer 245 is installed to photograph a forward region of the display apparatus 200, and may include a camera 246 for photographing a user's face as the recognition information of a user.

The camera 246 sends the first controller 270, an image frame such as a still image, a moving image, etc. acquired by an image sensor when a photographing function is implemented. The first controller 270 controls the first storage 260 and the display 230 to store the received image frame in the first storage 260 and to display it on the display 230.

Also, the camera 246 processes the image frame of the still image, obtained by the image sensor at intervals of first set time, for example, a half-hourly, under control of the first controller 270 when the display apparatus 200 according to an exemplary embodiment performs the personalization/aggregation information providing function, and then transmits it to the first controller 270. The user determination block 274 of the first controller 270 extracts a face image from the image frame of the processed still image through a publicly-known face recognition algorithm, and compares the extracted face image with the face images of the server account users, i.e., the reference recognition information stored in the first storage 260, thereby determining a server account user corresponding to a user who is currently viewing the display 120 (hereinafter, referred to as a 'current user').

Alternatively, the user recognizer 245 may further include the microphone MIC for receiving a user's voice as a user's recognition information. In this case, the microphone MIC according to an exemplary embodiment converts sound input at intervals of first set time, for example, a half-hourly, into an electric signal under control of the first controller 270 when the display apparatus 200 according to an exemplary embodiment performs the personalization/aggregation information providing function, and then transmits it to the first controller 270. The first controller 270 controls the sound processor 235 to modulate the received sound signal into sound data, and the user determination block 274 compares the modulated sound data with the sound data of the server account users, i.e., the reference recognition information stored in the first storage 260, through a publicly-known sound recognition algorithm, thereby determining the server account user corresponding to the current user.

Such determination of the server account user through the microphone MIC may be not accurate due to noise, output sound of a speaker SPK, or the like environments. Therefore, when the user recognizer 245 further includes the microphone MIC, the microphone MIC may be used as an auxiliary means for complementing the determination of the camera 246 for the server account user. For example, when it is difficult to determine the server account user since the face image extracted from the image frame of the image photographed by the camera 246 is unclear, the user determination block 274 may determine the server account user in further consideration of the sound data received through the microphone MIC.

Hereinafter, it will be described for convenience that the user recognizer 245 includes only the camera 246.

The first communicator 250 performs communication with the information providing server 300 and other information providing servers (not shown) through the network 110 using Internet. The first communicator 250 exchanges a user's input and its analysis results with the information providing server 300 and other information providing servers under control of the first controller 270.

The first communicator 250 may be achieved by a wired/wireless communication module for accessing the network 110, for example, a wired connection module such as a universal serial bus (USB), a mobile high-definition link (MHL), etc. or a wireless connection module such as near field communication (NFC), wireless fidelity (WiFi), Bluetooth, Infrared Data Association (hereinafter, referred to as 'IrDA'), Zigbee, wireless local area network (WLAN), ultra-wideband (UWB), etc.

The first storage 260 stores contents (broadcasting channels, VOD, etc.) to be reproduced in the display apparatus 200, image data photographed by the camera 246, sound data input by the microphone MIC, situation information including a use history of an application of the display apparatus 200, a search word at web browsing, a view history of a broadcast, a use history of the contents and the like, apparatus information about the display apparatus 200, and/or a control program such as firmware or the like for controlling the display apparatus 200.

Also, as mentioned above, according to an exemplary embodiment, the first storage 260 stores the reference recognition information for determining whether the current user is the server account user. The reference recognition information may include image data including face images of server account users whose 'friend' or the like information sharing relation with the display apparatus 200 has been set up, and/or sound data including voices of the server account users, and server account ID and/or user names for distinguishing between image data and/or sound data of the server account users.

The reference recognition information of the server account users is provided from the information providing server 300 by control of the first controller 270 and a user's request, and stored in the first storage 260, as will be described with reference to FIG. 7. In this case, the reference recognition information of the server account users may be updated under control of the first controller 270 at intervals of second set time, for example, three-hourly and/or in response to a user's request.

Also, the reference recognition information of the server account users may be input by users through 'input tab' of a setup menu for setting up a personalization/aggregation information providing function (not shown) through the user input 240 and then stored in the first storage 260, when it is needed.

Also, when the display apparatus 200 performs the personalization/aggregation information providing function according to an exemplary embodiment as will be described later, the first storage 260 may store server information of the server account users provided from the information providing server 300, and individual profiles and a grouping profile generated by the profile generating block 245 of the first controller 270 based on the server information.

The first storage 260 may be achieved by at least one storage medium of a flash memory type, a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The first controller 270 controls general functions of the display apparatus 200, and in particular, controls the functions of the display apparatus 200 in accordance with an input signal received from the user input 240 or a portable terminal.

The first controller 270 may include a central processing unit (CPU) and a RAM for executing the firmware or the operating system as the control program stored in the first storage 260.

Also, the first controller 270 performs a function of providing the personalization and the aggregation information without substantive authentication and login procedures for a user.

To this end, the first controller 270 includes an apparatus authentication block 271, a user determination block 274, a profile generating block 275, a profile service block 276.

The apparatus authentication block 271 requests the authentication of the display apparatus 200, to the information providing server 300, and has a login to the display apparatus 200, which includes an authentication information generator 272, and an authentication manager 273.

The authentication information generator 272 generates authentication information from the apparatus information stored in the first storage 260 if the information providing server 300 make a request for the authentication information when the display apparatus 200 registers a server account to the information providing server 300. The authentication information may include a unique ID given to the display apparatus 200 by a manufacturer of the display apparatus 200, the unique ID and an internal code key of the display apparatus 200, or the unique ID and a production or serial number of the display apparatus 200.

Also, the authentication information generator 272 generates server account information from the apparatus information stored in the first storage 260 if the information providing server 300 makes a request for the server account information to be registered. The server account information may include a server account ID and/or a password.

The server account ID may be formed by a model number of the display apparatus 200, manager ID, unique ID, uniform resource identifier (URI), globally unique identifier (GUID), a manager e-mail address, a product or serial number, or combination thereof, which can be easily found by a user of the display apparatus 200 and the password may be automatically generated by a publicly-known automatic password generator or automatic password generating algorithm.

Alternatively, the server account ID and/or the password may be directly set up by a user and stored in the first storage 260 instead of being generated by the authentication information generator 272.

The authentication manager 273 transmits the authentication information generated by the authentication information generator 272 to the information providing server 300 when the information providing server 300 makes a request for the authentication information for authenticating the display apparatus 200, thereby making the display apparatus 200 be authenticated in the information providing server 300

Also, the authentication manager 273 transmits the server account information generated by the authentication information generator 272 to the information providing server 300 when the information providing server 300 makes a request for the server account information for the sake of the server account registration or login of the display apparatus 200, thereby registering the server account of the display apparatus 200 or allowing the display apparatus 200 to log in to the information providing server 300.

The user determination block 274 determines whether the current users are the server account users registered to the information providing server 300, in particular, whether the current users are the server account users whose the information sharing relation with the display apparatus 200 has been set up.

That is, the user determination block 274 extracts the face images of the current users from the image data transmitted from the camera 246 of the user recognizer 245 through the publicly known face recognition algorithm, and compares each extracted face image of the current users with the face images of photo image data of the reference recognition information of the server account users stored in the first storage 260, thereby determining whether a matching face image is present. In result of determination, if the matching face image is present, the user determination block 274 determines accuracy of determining a user, that is, determines whether a matching rate between the extracted face images of the current users and the face image of the photo image data of the reference recognition information is equal to or higher than a first rate, for example, 95%. Here, the first rate of 95% is just an example, and may vary. In result of determination, if the matching rate is equal to or higher than 95%, the user determination block 274 determines the current user of the matched face image as the server account user, and stores the corresponding server account user in the first storage 260. At this time, the first storage 260 stores the server account ID and/or a user name of the corresponding server account user together with the face image of the matched current user. In result of determination, if the matching rate is lower than 95%, the user determination block 274 determines the corresponding current user as a general user who cannot access a content not publicly opened by the corresponding server account user. At this time, the first storage 260 stores only the face image of the corresponding current user.

Also, as mentioned above, if the user recognizer 245 additionally includes the microphone MIC, the user determination block 274 convert the sound signal input by the microphone MIC into sound data through modulation of the sound processor 235, and extracts the sound data of the current users from the converted sound data through the publicly-known sound recognition algorithm. The user determination block 274 further compares each of the extracted sound data of the current users with the sound data of the reference recognition information of the server account users stored in the storage 260, and determines whether matching sound data is present. In result of determination, if the matched sound data is present, the user determination block 274 further determines whether the matching rate is equal to or higher than the first rate, for example, 95%. In result of determination, if the matching rate is equal to or higher than 95%, the user determination block 274 determines a user of the matched sound data as the server account user, and stores the server account ID and/or a user name of the corresponding server account user together with the sound data of the current user in the first storage 260. In result of determination, if the matching rate is lower than 95%, the user determination block 274 determines the corresponding current user as a general user, and stores only the sound data of the corresponding current user in the first storage 260.

The user determination block 274 determines the current user at intervals of first set time, for example, a half-hourly, and updates and stores the determined current user in the first storage 260. At this time, the update of the current user may be also performed when users use the user input 240 to make a request for updating the recognition information through the recognition information update tab of the setup menu for setting up the personalization/aggregation information providing function.

In the foregoing description, the user determination block 274 determines the current user as only the server account user and the general user, but not limited thereto.

That is, the user determination block 274 may subdivide the server account user into a definite server account user that is surely the server account user, a reliable server account user that is more likely to be the server account user, a potential server account user that is less likely to be the server account user, and a general user that is very unlikely to be the server account user in accordance with accuracy of user determination.

For example, when each face image of the current users extracted from the image data transmitted from the camera 246 of the user recognizer 245 through the face recognition algorithm is compared with the face images of the photo image data of the reference recognition information of the server account users stored in the first storage 260, if the matching rate is equal to or higher than the first rate, for example, 95%, the corresponding user may be determined as the definite server account user. Also, if the matching rate ranges between a second rate and the first rate, for example, between 80% and 95%, the corresponding user may be determined as the reliable server account user. Also, the matching rate ranges between a third rate and the second rate, for example, between 50% and 80%, the corresponding user may be determined as the potential server account user. Also, the matching rate is lower than the third rate, for example, 50%, the corresponding user may be determined as a general user. Here, the subdivision of the server account user and the first to third rates 95%, 80% and 50% are given as an example, and may be set up differently.

The profile generating block 275 requests the server information about each corresponding server account user determined by the user determination block 274, to the information providing server 300 at intervals of third set time, for example, six-hourly when there is an input through the user input 240, and receives the server information from the information providing server 300, thereby updating and storing the server information in the first storage 260. The server information will be used for a personalization or aggregation content view function to be described later.

In more detail, the profile generating block 275 extracts personalization data (for example, a concerned subject, a concerned search word) of a server account user (hereinafter, referred to as a 'corresponding server account user') determined as the current user from the situation information stored in the first storage 260, and requests the server information about the corresponding server account user to the information providing server 300 while transmitting the personalization data and personal information of the corresponding server account users extracted through the first communicator 250 to the information providing server 300.

The situation information includes information about a use history of an application of the display apparatus 200, a search word at web browsing, a view history of a broadcast, a use history of contents, etc. of the corresponding server account users (i.e., the current users) collected by the profile generating block 275.

The personalization data is used for searching and collecting concerned contents or personalization information (for example, a posting, a document, an image, a moving image, a broadcasting channel, etc.) (hereinafter, referred to as the 'personalization information' of the corresponding server account users in an SNS providing block 343 of the information providing server 300 to be described later with reference to FIG. 7. The information providing server 300 searches the corresponding personalization information of server account users based on the personalization data of the corresponding server account users provided from the profile generating block 275 in the SNS providing block 343, and provides the personalization information obtained by the search as the server information of the corresponding server account users, to the profile generating block 275 through the second communicator 310. The personalization information is obtained from information of the corresponding server account users opened to friends and information of the corresponding server account users opened to the public, based on the personalization data of the corresponding server account users. The information opened to friends includes information on which the corresponding server account users gives authority of reading, copying, storing, etc. to the display apparatus 200 through sharing settings such as forming a 'friend' in the information providing server 300. For example, the information opened to friends may include personal information and posting registered or uploaded by the corresponding server account users to the information providing server 300, and contents such as a document/an image/a moving image, etc. uploaded by the corresponding server account users. The information opened to the public includes information opened to all of other general server account users by all of server account users of the information providing server 300 including the corresponding server account users. For example, the information opened to the public may include contents such as posting, a document/an image/a moving image, etc. uploaded by the corresponding server account users.

The profile generating block 275 receives the personalization information, that is, the server information of the corresponding server account users provided from the information providing server 300 through the first communicator 250, and stores it in the first storage 260.

Also, the profile generating block 275 generates a plurality of individual profiles including profile information respectively optimized to the corresponding server account users (that is, the current users) determined by the user determination block 274, and stores the plurality of generated individual profiles in the first storage 260. Here, the profile information of each individual profile refers to information showing whether an access of the current user to the personalization information is allowed or not, which is varied depending on the accuracy of the user determination or the like, as will be described later.

The plurality of individual profiles is formed by classifying the profile information about the information opened to friends and the information opened to the public of the personalization information provided by the information providing server 300, in accordance with the corresponding server account users.

Also, the plurality of individual profiles each may include a server account user profile including the profile information allowing the corresponding server account user to access the friend open personalization information and the public open personalization information of the personalization information, and a general user profile including the profile information allowing the corresponding server account user to access only the public open personalization information of the personalization information.

Figure 5:
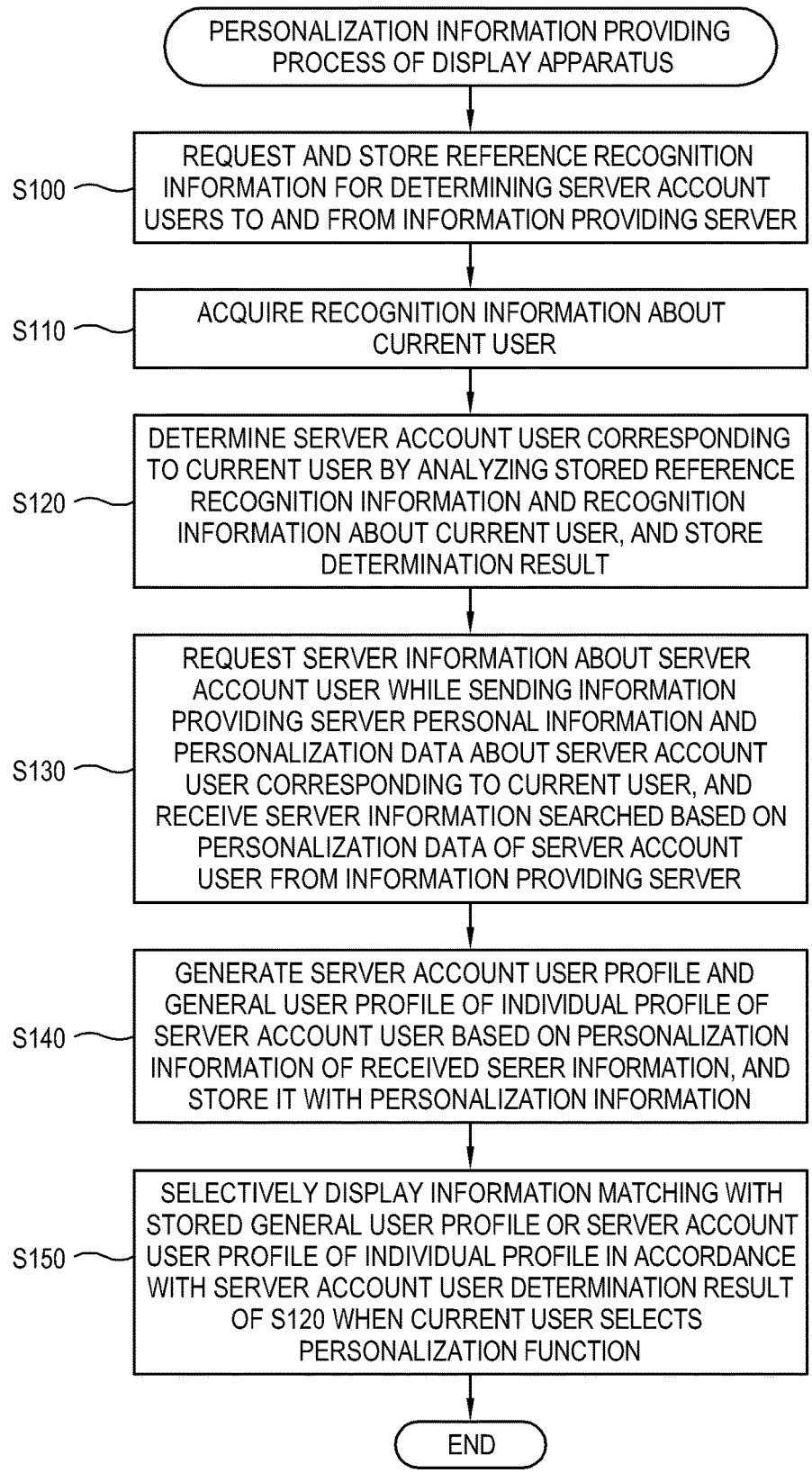
FIG. 5 is a flowchart showing a personalization information providing process in the display apparatus of FIG. 1.

The server account user profile is used for providing a personalization function to the current user determined as the definite server account user on a screen or window of the display apparatus 200 displaying the personalization/aggregation information, when the user determination block 274 determines the current user as the definite server account user while a single user is viewing or using the display apparatus 200, as will be described later with reference to FIG. 5.

The general user profile is used for providing a personalization function to the current user determined as a general user on the screen of the display apparatus 200 displaying the personalization/grouping information when the user determination block 274 determines the current user as the general user while a single user is viewing or using the display apparatus 200.

Alternatively, if the user determination block 274 subdivides the current user into the definite server account user, the reliable server account user, the potential server account user, and the general user in accordance with the accuracy of user determination, the plurality of individual profiles may be each subdivide into a first server account user profile, a second server account user profile, a third server account user profile and a general user profile in accordance with security classification of the personalization information to which access is allowed.

The first server account user profile for the definite server account user includes profile information for allowing an access to both the friend open personalization information and the public open personalization information of the personalization information of the corresponding server account user. The second server account user profile for the reliable server account user includes profile information for allowing an access to information excluding a first security information of the corresponding server account user between the friend open personalization information and the public open personalization information of the personalization information of the corresponding server account user. The third server account user profile for the potential server account user includes profile information for allowing an access to information excluding the first and a second security information of the corresponding server account user between the friend open personalization information and the public open personalization information of the personalization information of the corresponding server account user. The general user profile includes profile information for allowing an access to only the public open personalization information of the personalization information of the corresponding server account user.

Figure 13:
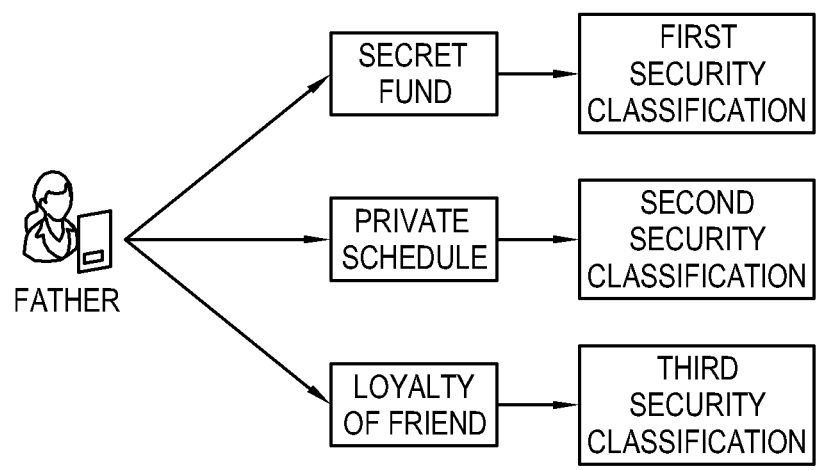
FIGS. 13 to 16 are views showing a security classification method when a server account user profile of an individual profile is created according to an exemplary embodiment.
Figure 14:
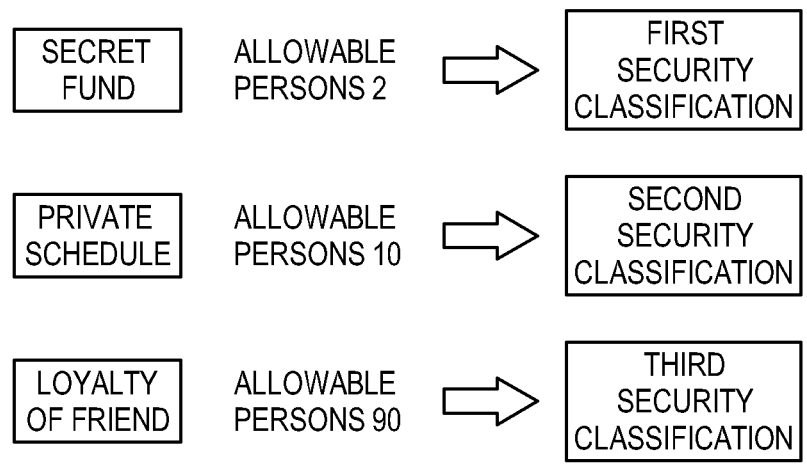
Figure 15:
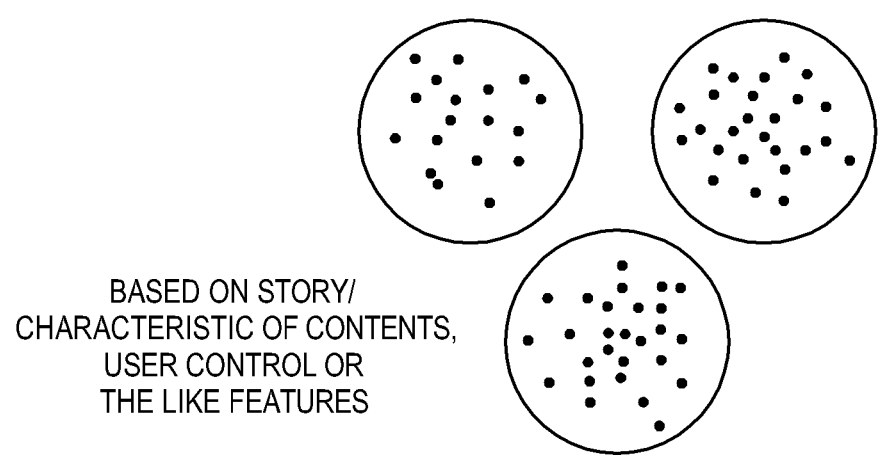
Figure 16:
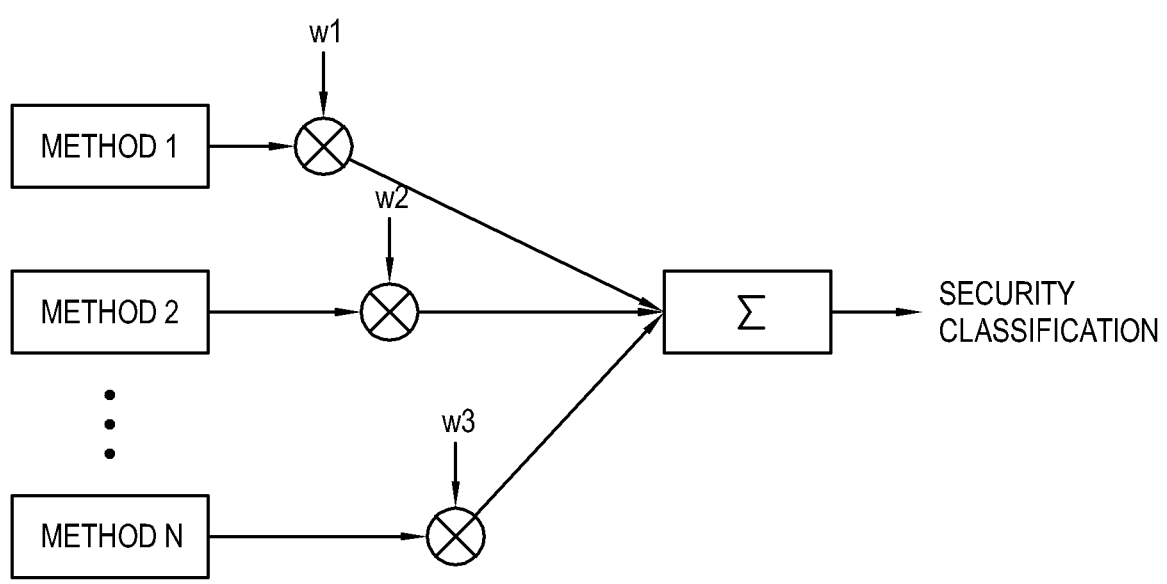

Here, the first to third security information may be classified by a method that the current user corresponding to the corresponding server account user, for example, a husband performs direct setup as shown in FIG. 13, a method that the profile generating block 275 performs inference based on the number of access allowable persons set up by the corresponding server account user as shown in FIG. 14, a method that the profile generating block 275 learns security classification pattern and performs classification through a machine learning algorithm as shown in FIG. 15, or a method of combining the direct setup method, the inference method and the security pattern learning method as shown in FIG. 16.

The first to third server account user profile and the general user profile may be used for providing the personalization function to the current user determined as the definite server account user, the reliable server account user, the potential server account user or the general user on a screen displaying the personalization/aggregation information if the user determination block 274 determines the current user as the definite server account user, the reliable server account user, the potential server account user, or the general user in the state that a single user is viewing or using the display apparatus 200.

Also, the profile generating block 275 forms the group profile including the profile information optimized to a group including a plurality of current users based on the personalization information of the corresponding server account users provided from the information providing server 300. Here, the profile information of the group profile refers to information showing whether a group including the plurality of current users can be allowed to have an access to each piece of personalization information, which may be varied depending on the authority, preference, and/or characteristic of the plurality of corresponding server account users, as will be described later.

Figure 6:
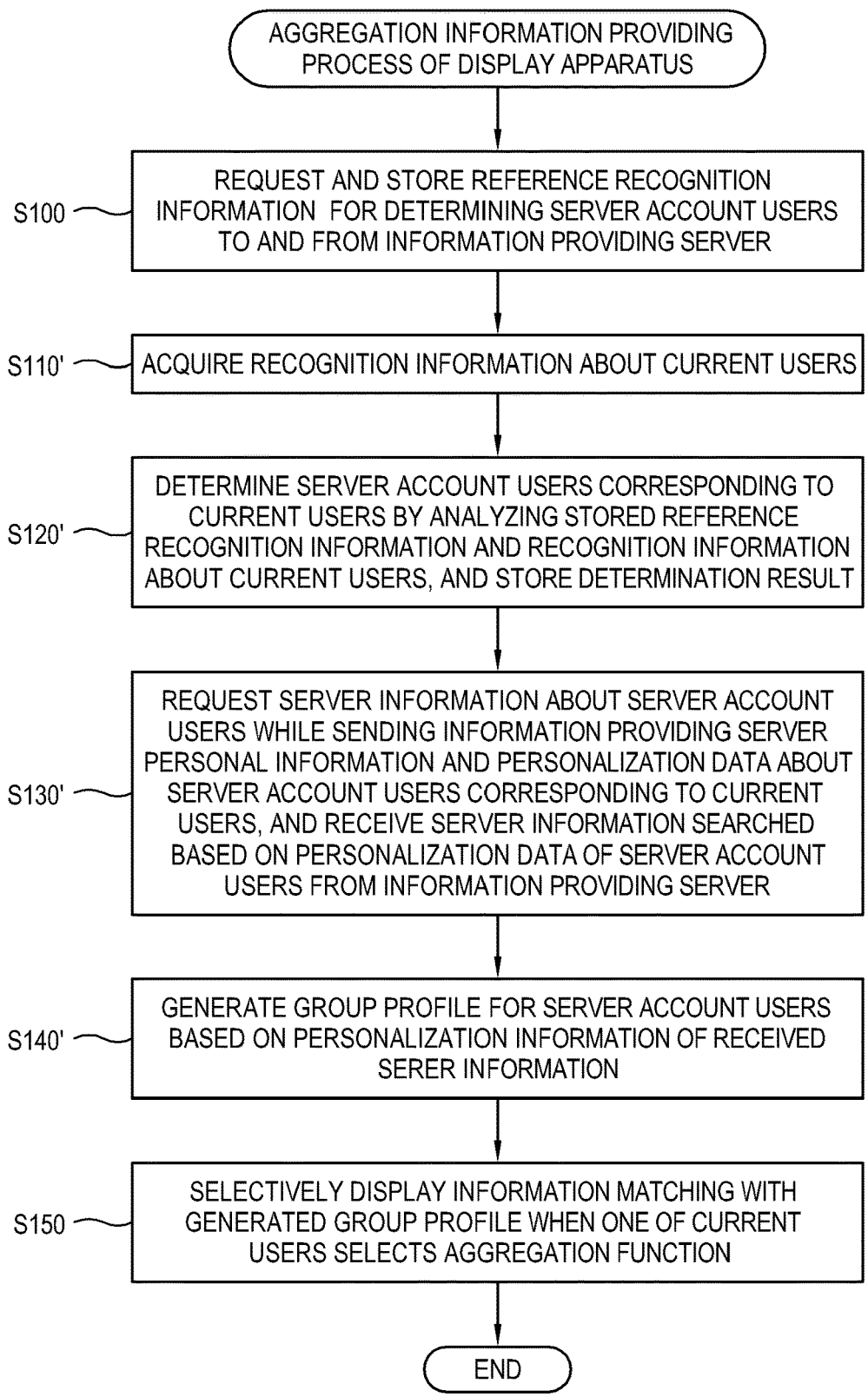
FIG. 6 is a flowchart showing a grouping information providing process in the display apparatus of FIG. 1.

The group profile is used to provide a grouping function to the group of current users on the screen of displaying the personalization/aggregation information provided by the display apparatus 200 if the user determination block 274 determines all or some of the current users as the server account users while the plurality of current users are viewing or using the display apparatus 200 to be described later with reference to FIG. 6. Here, the aggregation function refers to a function that can differentially manage the functions such as information search or the like provided by the display apparatus 200 in accordance with the groups even though the group of current users is changed.

In more detail, the profile generating block 275 generates the group profile including the profile information that differentiate the access of the group of current users to the personalization information of the plurality of server account users, in accordance with the authority to the personalization information of the plurality of corresponding server account users.

Here, the authority refers to authority to read, copy and store the personalization information that includes personal information such as a personal photograph, sex, age, e-mail address, server account ID, etc., upload information such as a movie file, a document, etc., composed information such as posting, etc. The authority may be given when the display apparatus 200 and/or the server account user subscribed to the information providing server 300 forms a 'friend' or the like information sharing relation with the server account user who has original authority in the information providing server 300 to be described later with reference to FIG. 7.

The authority over the personalization information of the corresponding server account users may be reflected on the group profile in such a manner of an intersection, union, or potential user considering method.

Figure 17:

As shown in FIG. 17, the intersection method is to configure the profile information so that a group including a plurality of current users can have an access to the personalization information to which all of the display apparatus 200 and the corresponding server account users have the authority, among the pieces of personalization information of the corresponding server account users.

For example, in the state that the display apparatus 200, a father, a mother and a son form a 'friend' in the information providing server 300, if personalization information of the son includes personalization information "Animation Pororo" and "birthday party schedule" that the son shares with the 'friend' as shown in the following table 1, profile information is configured so that the group of current users can have an access to "Animation Pororo" and "Birthday party schedule". Since mother's "front door lock key number" is also personalization information shared with the 'friend' the profile information is configured so that the group of current users can have an access thereto. On the other hand, since father's "secret fund breakdown" and "X-rated movie" and mother's a "shopping breakdown" are not personalization information shared with the 'friend' the profile information is configured so that the group of current users cannot have an access thereto.

TABLE 1

Generation of group profile based on intersection method

| Current user(server account user) | Personalization information | Authority | | | Group Profile |
|---|---|---|---|---|---|
| | | Son | Father | Mother | |
| Son | Pororo | o | o | o | o |
| | Birthday party schedule | o | o | o | o |
| Father | Secret fund breakdown | x | o | x | x |
| | X-rated movie | x | o | x | x |

TABLE 1-continued

Generation of group profile based on intersection method

| Current user(server account user) | Personalization information | Authority | | | Group Profile |
|---|---|---|---|---|---|
| | | Son | Father | Mother | |
| Mother | Shopping breakdown | x | x | o | x |
| | Front door lock key number | o | o | o | o |

Such an intersection method allows the group of current users to access only the personalization information to which all of the current users have the authority, and it is therefore possible to maintain a secret of the personalization information not opened by each user. However, subjects readable or viewable by each user may be restricted as necessary.

As shown in FIG. 18, the union method is to configure the profile information so that a group including a plurality of current users can have an access to any personalization information to which one of the corresponding server account users and the display apparatus 200 have the authority, among the pieces of personalization information of the corresponding server account users.

In this union method, as shown in the following table 2, since son's "Animation Pororo" and "birthday party schedule" and mother's "front door lock key number" are all the personalization information shared with the 'friend' and father's "secret fund breakdown" and "X-rated movie" and mother's "shopping breakdown" are also the personalization information to which father and mother can respectively have the authority, the profile information is configured so that all pieces of personalization information can have an access to the group of current users.

TABLE 2

Generation of group profile based on union method

| Current user(server account user) | Personalization information | Authority | | | Group profile |
|---|---|---|---|---|---|
| | | Son | Father | Mother | |
| Son | Pororo | o | o | o | o |
| | Birthday party schedule | o | o | o | o |
| Father | Secret fund breakdown | x | o | x | o |
| | X-rated movie | x | o | x | o |
| Mother | Shopping breakdown | x | x | o | o |
| | Front door lock key number | o | o | o | o |

Such a union method allows all of the current users to read each user's personalization information, but each user's personalization information may be unintentionally opened to another user.

Figure 19:
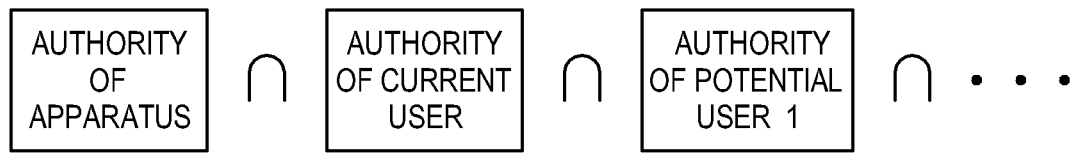

As shown in FIG. 19, the potential user considering method is to further consider potential users who are out for a while in addition to the foregoing intersection method, that is, to configure the profile information so that a group including the current users can have an access to the personalization information to which the server account users corresponding the current users and potential users can simultaneously have the authority, among the pieces of personalization information of the corresponding server account users provided from the information providing server 300.

For example, if a cousin forming a 'friend' with the display apparatus 200 and son is out for a moment while viewing or using the display apparatus 200, as shown in the following table 3, son's "Animation Pororo" and "birthday party schedule" are all the personalization information shared with a cousin as the 'friend' and thus the profile information is configured, so that a group of current users can be allowed to have an access thereto. On the other hand, father's "secret fund breakdown" and "X-rated movie" and mother's "shopping breakdown" and "front door lock key number" are not the personalization information shared with the 'friend' and therefore the profile information is configured, so that the group of current users can not be allowed to have an access thereto.

TABLE 3

Generation of group profile based on potential user considering method

| Current user (server account user) | Personalization information | Authority | | | | |
|---|---|---|---|---|---|---|
| | | Son (Current user) | Father (Current user) | Mother (Current user) | a cousin (potential user) | Group profile |
| Son | Pororo | ○○ | ○ | ○ | ○ | ○ |
| | Birthday party schedule | ○ | ○ | ○ | ○ | ○ |
| Father | Secret fund breakdown | x | ○ | x | x | x |
| | X-rated movie | x | ○ | x | x | x |
| Mother | Shopping breakdown | x | x | ○ | x | x |
| | Front door lock key number | ○ | ○ | ○ | x | x |

Figure 20:
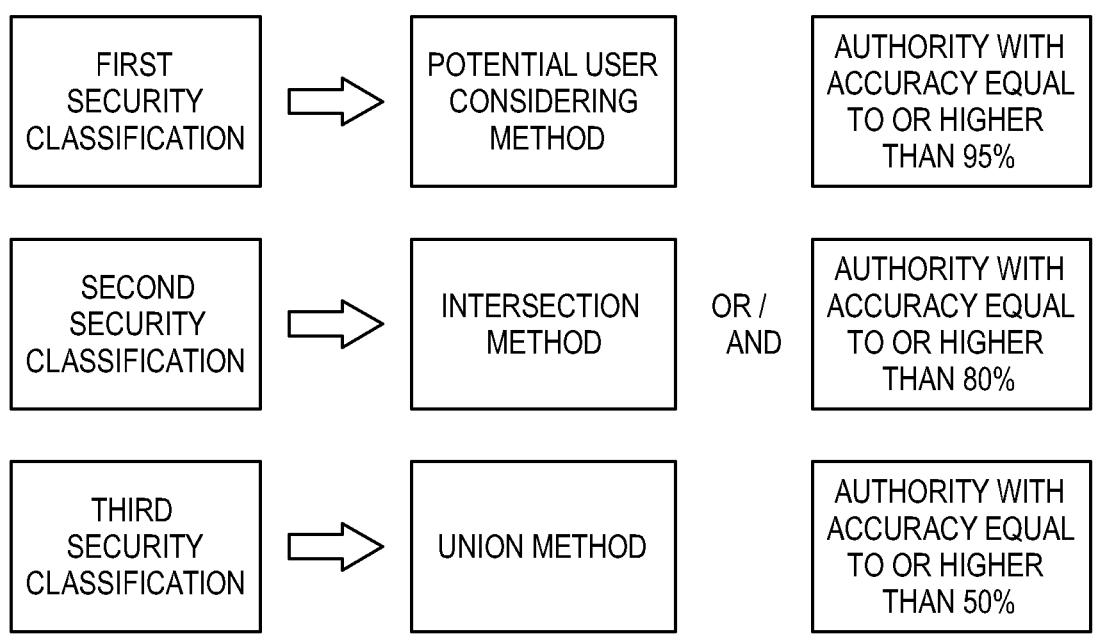

Alternatively, if the user determination block 274 subdivides the current user into the definite server account user, the reliable server account user, the potential server account user, and the general user in accordance with accuracy of a user determination, as shown in FIG. 20 the authority of the personalization information of the corresponding server account users may be reflected on the group profile by the intersection method according to security classification, the union method according to security classification or the potential user considering method according to security classification with regard to the personalization information of the plurality of corresponding server account users.

The intersection method according to security classification is a method of differentially reflecting the personalization information of the corresponding server account users onto the profile information of the group profile in accordance with accuracy of user determination and item security classification in addition to the intersection method described with reference to the table 1, that is, a method of configuring the profile information so that the group of current users can be allowed to have the access to the personalization information having security classification for allowing an access of all of the definite server account user, the reliable server account user, the reliable server account user and/or the general user determined by the accuracy of the user determination with regard to the current users, among the personalization information of the corresponding server account users.

The item security classification may include a first security item to which the definite server user has an access; a second security item to which the definite server user and the reliable server user can have an access; a third security item to which the definite server user, the reliable server user and the potential server user can have an access; and a general item to which any user can have an access. The item security classification may be classified equally to the first to third security information.

For example, as shown in the following table 4, in the state that son, father, and mother are respectively determined as the definite server account user, the reliable server account user, and the reliable server account user, if "Animation Pororo" is set up as the third security item, "birthday party schedule" is set up as the second security item, and "secret fund breakdown" "X-rated movie" and "shopping breakdown" are set up as the first security items, since "Animation Pororo" of the third security item and "birthday party schedule" of the second security item have the security classification that can be accessed by son, i.e., the definite server account user and father and mother, i.e., the reliable server account users, the profile information may be configured to allow the access of the group of current users thereto.

TABLE 4

Generation of group profile based on intersection method according to security classification

| current user(server account user) | personalization information item | security | son (definite server accounta user) | father (reliable server accounta user) | mother (reliable server accounta user) | group profile |
|---|---|---|---|---|---|---|
| son | Pororo | 3 | 1 | 2 | 2 | ○ |
| | birthday party schedule | 2 | 1 | 2 | 2 | ○ |
| father | secret fund breakdown | 1 | x | 2 | x | x |
| | X-rated movie | 1 | x | 2 | x | x |
| mother | shopping breakdown | 1 | x | x | 2 | x |
| | front door lock key number | 1 | 1 | 2 | 2 | x |

The union method according to security classification is a method of differentially reflecting the personalization information of the corresponding server account users onto the profile information of the group profile in accordance with accuracy of user determination and item security classification in addition to the union method described with reference to the table 2, that is, a method of configuring the profile information so that the group of current users can be allowed to have the access to the personalization information having security classification that can be accessed by at least one of the definite server account user, the reliable server account user, the reliable server account user and the general user determined by the accuracy of the user determination with regard to the current users, among the personalization information of the corresponding server account users.

For example, as shown in the following table 5, with the security classification that "Animation Pororo" of the third security item and "birthday party schedule" of the second security item can be accessed by son, i.e., the definite server account user and father and mother, i.e., the reliable server account users, and with the security classification that "front door lock key number" of the first security item can be accessed by son, i.e., the definite server account user, the profile information can be configured so that the group of current users can be allowed to have an access to "Animation Pororo", "birthday party schedule" and "front door lock key number".

personalization information of the corresponding server account users onto the profile information of the group profile in accordance with accuracy of user determination and item security classification in addition to the intersection method according to the security classification described with reference to the table 4, that is, a method of configuring the profile information so that the group of current users can be allowed to have the access to the personalization information having security classification that can be accessed by all of the server account users determined by the accuracy of the user determination with regard to the current users and potential users, among the personalization information of the corresponding server account users.

For example, as shown in the following table 6, if a cousin is additionally determined as the potential server account user as compared with tables 4 and 5, only "Animation Pororo" of the third security item has security classification that can be accessed by all of son, i.e., the definite server account user, father and mother, i.e., the reliable server account users, and cousin, i.e., the potential server account user, and therefore the profile information can be configured

TABLE 5

Generation of group profile based on union method according to security classification

| current user(server account user) | personalization information item | security | son (definite server accounta user) | father (reliable server accounta user) | mother (reliable server accounta user) | group profile |
|---|---|---|---|---|---|---|
| son | Pororo | 3 | 1 | 2 | 2 | ○ |
|  | birthday party schedule | 2 | 1 | 2 | 2 | ○ |
| father | secret fund breakdown | 1 | x | 2 | x | x |
|  | X-rated movie | 1 | x | 2 | x | x |
| mother | shopping breakdown | 1 | x | x | 2 | x |
|  | front door lock key number | 1 | 1 | 2 | 2 | ○ |

The potential user considering method according to security classification is a method of differentially reflecting the so that the group of current users can be allowed to have an access thereto.

TABLE 6

Generation of group profile based on potential user considering method according to security classification

| current user(server account user) | personalization information item | security | son (currenta user; definite server account user) | father (currenta user; reliable server account user) | mother (currenta user; reliable server accountuser) | a cousin (potential user; reliable server account user) | group profile |
|---|---|---|---|---|---|---|---|
| son | Pororo | 3 | 1 | 2 | 2 | 3 | ○ |
|  | birthday party schedule | 2 | 1 | 2 | 2 | 3 | x |

TABLE 6-continued

Generation of group profile based on potential user considering method according to security classification

| current user(server account user) | personalization information | | son (currenta user; definite server account user) | father (currenta user; reliable server account user) | security mother (currenta user; reliable server accountuser) | a cousin (potential user; reliable server account user) | group profile |
|---|---|---|---|---|---|---|---|
| | item | security | | | | | |
| father | secret fund breakdown | 1 | x | 2 | x | x | x |
| | X-rated movie | 1 | x | 2 | x | x | x |
| mother | shopping breakdown | 1 | x | x | 2 | x | x |
| | front door lock key number | 1 | 1 | 2 | 2 | x | x |

Thus, the intersection, union and potential user considering methods according to security classification can reduce shortcomings of the intersection, union and potential user considering methods described with reference to tables 1 to 3, but there is a need of assigning the security classification to each item of the personalization information.

Also, the profile generating block 275 may generate the group profile by further reflecting users preference for the personalization information of the corresponding server account users after generating the group profile in which the authority is reflected. The preference refers to a user's preferable level to topics such as basketball, baseball, military story, loyalty of friend, shopping, etc. extracted from situation information by the profile generating block 275 of the first controller 270.

For example, father's personalization information may include personalization information related to his preferable topic such as military story and loyalty of friend, mother's personalization information may include personalization information related to her preferable topic such as shopping, son's personalization information may include personalization information related to his preferable topic such as basketball and baseball.

The preference for the personalization information of the corresponding server account users may be reflected in the group profile by a representative value reflecting method, a minimum value reflecting method, a maximum value reflecting method, a circulation reflecting method, or a combination method.

Figure 21:
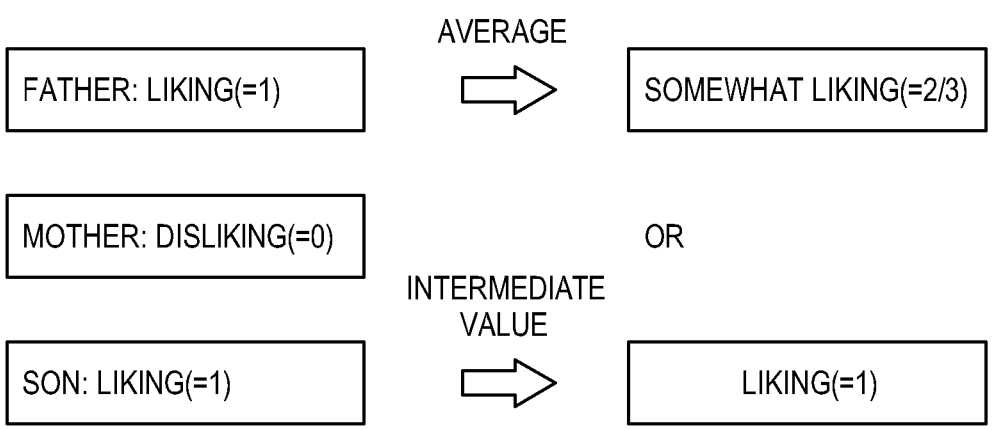
Figure 22:
Figure 23:
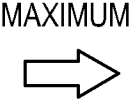

The method of reflecting a representative value refers to a method of reflecting the representative value such as an average or intermediate value of preference values about preferable topics as shown in FIG. 21 and the following table 7, which can uniformly reflect many users preferences to the group profile, but some users may dislike the reflected topic if a standard deviation is high. Also, the minimum value reflecting method refers to a method of reflecting a preference value of a user who has the lowest preference for each preferable topic as shown in FIG. 22 and the following table 7, which is no trouble to all users since the profile information is configured so that the group of current users is not allowed to have the access if there is no topic preferred by any one of the users, but no body may be given the most preferable information. Also, the maximum value reflecting method refers to a method of reflecting a preference value of a user who has the highest preference for each preferable topic as shown in FIG. 23 and the following table 7, which can satisfy at least one user, but the information may be determined to be offered in accordance with a certain user's extreme tastes.

TABLE 7

Examples of the methods of reflecting representative value/minimum value/maximum value

| Personal preference information (preferable topic) | preference value (1: liking, 0: disliking, 0.5: intermediate) | | | representative value (average) reflecting method | minimum value reflecting method | maximum value reflecting method |
|---|---|---|---|---|---|---|
| | son | father | mother | | | |
| military story | 0 | 1 | 0 | x: 0.3 (somewhat disliking) | x | ○ |
| loyalty of friend | 0.5 | 1 | 0 | ○: 0.5 (intermediate) | x | ○ |
| shopping | 1 | 1 | 1 | ○: 1 (liking) | ○ | ○ |
| basketball | 1 | 1 | 0 | ○: 0.7 (somewhat liking) | x | ○ |
| baseball | 1 | 1 | 0 | ○: 0.7 (somewhat liking) | x | ○ |

As shown in FIG. 24 and the following table 8, the circulation reflecting method refers to a method of giving an order of priority to preferable topics according to users, and generating the group profile so that the personalization information related to each user's preferable topic having the high priority can be alternately provided whenever rebrowsing is selected on the screen of displaying the personalization/aggregation information. This method may satisfy the users alternately, but cannot satisfy the users at the same time.

account users after generating the group profile in which the authority and/or the preference is reflected. The characteristic refers to a user's attribute such as hometown, school, or the like extracted from personal information and/or situation information.

For example, the personalization information of a father who graduated from A' high school in an A city includes the personalization information about characteristics of the A city and A' high school, the personalization information of a mother who graduated from B' high school in a B city

TABLE 8

Example of circulation reflecting method

| current user(server account user) | personalization information (preferable topic) | priority | group profile | | | | |
|---|---|---|---|---|---|---|---|
| | | | Primary browsing | Secondary browsing | Tertiary browsing | Quaternary browsing | Quinary browsing |
| son | basketball | 1 | ○ | x | x | x | x |
| | baseball | 2 | x | x | x | ○ | x |
| father | military story | 1 | x | ○ | x | x | x |
| | loyalty of friend | 2 | x | x | x | x | ○ |
| mother | shopping | 1 | x | x | ○ | x | x |

Figure 25:
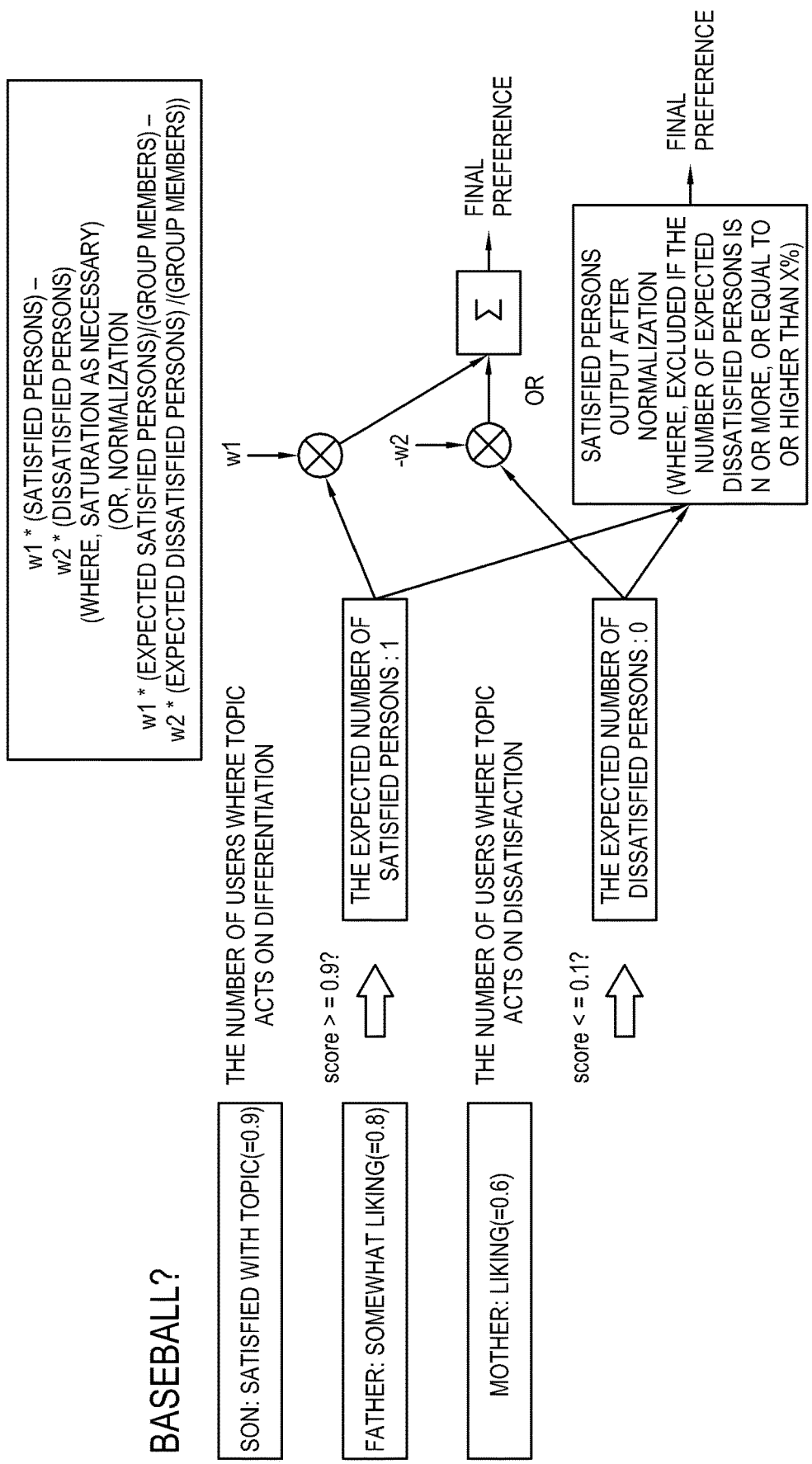

The combination method refers to a method of evaluating a user's satisfaction with regard to each preferable topic in personalization information of the corresponding server account users, determining a final preference W or W' in accordance with the following expression (1) or (2) based on a value of the evaluated satisfaction, and configuring profile information of the group profile so that the group of current users can have an access to each personalization information in accordance with the determined final preference, as shown in FIG. 25 and the following table 9.

$$W = W1 - W2 \text{ (excluded when } W2 \text{ is equal to or higher than } n) \quad (1)$$

Here, W1 is the number of users who have a positive satisfaction value equal to or higher than, for example, 0.9, W2 is the number of users who have a negative satisfaction value lower than, for example, 0.1, and n is a natural number.

$$W' = W1/T - W2/T \text{ (excluded when } W2/T*100 \text{ is equal to or higher than } m \text{ \%)} \quad (2)$$

Here, T is a total number of users, and m is a natural number includes the personalization information about characteristics of the B city and B' high school, and the personalization information of a son who attends C' high school in a C city includes the personalization information about characteristics of the C city and C' high school.

Such user's characteristics of the personalization information of the corresponding server account user may be reflected to the group profile by the representative value reflecting method, the minimum value reflecting method, the maximum value reflecting method, the circulation reflecting method, or the combination method, like the foregoing preference. These methods are the same as those described with regard to the preference, and thus repetitive descriptions thereof will be omitted.

The profile service block 276 displays requested information on the display 230 in the form of a preset displaying type based on the server account user profile/the general user profile of the individual profiles or the group profile stored in the first storage 260, when the current user requests the information In more detail, in the state that a single user is viewing or using the display apparatus 200, if the user determination

TABLE 9

Example of combination method

| personalization information (preferable topic) | satisfaction value (0.9 or higher: positive, 0.1 or lower: negative) | | | W1 (W1/ T) | W2 (W2/ T) | W (W') | group profile |
|---|---|---|---|---|---|---|---|
| | son | father | mother | | | | |
| military story | 0.3 | 0.9 | 0.4 | 1 (0.3) | 0 (0) | 1 (0.3) | ○ |
| loyalty of friend | 0.5 | 0.9 | 0.1 | 1 (0.3) | 1 (0.3) | 0 (0) | x |
| shopping | 0.5 | 0.3 | 0.9 | 1 (0.3) | 0 (0) | 1 (0.3) | ○ |
| basketball | 0.9 | 0.9 | 0.5 | 2 (0.7) | 0 (0) | 2 (0.7) | ○ |
| baseball | 0.9 | 0.8 | 0.6 | 1 (0.3) | 0 (0) | 1 (0.3) | ○ |

Also, the profile generating block 275 may generate the group profile by further reflecting users characteristics about the personalization information of the corresponding server block 274 determines the current user as the server account user, and the current user selects an item corresponding to a personalization function, for example a 'personalization content view' function through an input or the like on the user input 240 in order to use the 'personalization content view' function on the screen of displaying the personalization/grouping information provided by the display apparatus 200, the profile service block 276 selects and display only the information corresponding to the server account user profile or the general user profile of the corresponding individual profiles stored in the first storage 260, on the display 230 in accordance with whether the current user is the definite server account user or the general user, among the personalization information of the corresponding server account user updated and stored in the first storage 260 in response to the user's input or at intervals of third predetermined time.

At this time, the information selected and displayed on the display 230 may be classified by a plurality of categories based on the type or story of content, for example, a posting, a broadcast, a game, a movie, an animation, music, a moving image, a photograph, an application, a website, a web document, news, etc. Also, the information selected and displayed on the display 230 may be formed and displayed in the form of a button where corresponding contents are displayed as a popup window or in the form of a list where a title or phrase to which a web address is linked is displayed, when an item of the selected information is clicked.

Alternatively, in case that the user determination block 274 subdivides the current user into the definite server account user, the reliable server account user, the potential server account user, and the general user in accordance with the accuracy of user determination, the profile service block 276 may select and display on the display 230, the information corresponding to the first server account user profile, the second server account user profile, the third server account user profile or the general user profile subdivided by the profile generating block 275 in accordance with the determined server account user, among the personalization information of the corresponding server account user stored in the first storage 260 when the current user selects the item corresponding to the 'personalization content view' function.

Meanwhile, in the state that the plurality of users are viewing or using the display apparatus 200, if the user determination block 274 determines that the current users are the definite server account users and/or the general users, and one user among the plurality of users selects an item corresponding to the 'aggregation content view' function through the input or the like on the user input 240 in order to use the aggregation function, for example, the 'aggregation content view' function on the screen of displaying the personalization/aggregation information, the profile service block 276 selects the information corresponding to the group profile described with references to the tables 1 to 3 and 7 to 9 stored in the first storage 260 from the personalization information of the corresponding server account users stored in the first storage 260 and displays it on the display 230.

At this time, like the case where the personalization content view function is selected, the information selected and displayed on the display 230 may be classified and displayed by a plurality of categories based on the type or story of content, for example, a posting, a broadcast, a game, a movie, an animation, music, a moving image, a photograph, an application, a website, a web document, news, etc. Alternatively, the information selected and displayed on the display 230 may be classified according to users, or may be formed and displayed in the form of combining the classification based on categories and the classification based on users, instead of being classified by the plurality of categories based on the type or story of content. Also, the information selected and displayed on the display 230 may be formed and displayed in the form of a button where corresponding contents are displayed as a popup window or in the form of a list where a title or phrase to which a web address is linked is displayed, when an item of the selected information is clicked.

Also, if the user determination block 274 subdivides the current user into the definite server account user, the reliable server account user, the potential server account user, and the general user, the profile service block 276 may select the information corresponding to the group profile described with reference to the tables 4 to 9 from the personalization information of the corresponding server account users stored in the first storage 260 and displays it on the display 230 when a user selects the 'aggregation content view' function on the screen of displaying the personalization/aggregation information.

Also, the profile service block 276 may further consider whether contents of the personalization information have not to be opened to any one of the current users, i.e., do not satisfy open conditions such as ages, security, etc., before the personalization information based on the group profile is displayed on the display 230.

For example, if the personalization information is an "X-rated movie" or a "front door lock key number" and any one of the corresponding server account users does not satisfy the conditions such as a range of ages or a level of security, the "X-rated movie" or the "front door lock key number" may be excluded from the information to be displayed on the display 230.

The apparatus authentication block 271, the user determination block 274, the profile generating block 275 and the profile service block 276 may be achieved by an application-specific integrated circuit (ASIC) designed to have an execution program capable of performing the authentication/user determination/profile generation/profile service function.

Alternatively, the apparatus authentication block 271, the user determination block 274, the profile generating block 275 and the profile service block 276 may be achieved by not the ASIC but execution programs capable of performing the authentication/user determination/profile generation/profile service functions. In this case, the execution program capable of performing the authentication/user determination/profile generation/profile service function is stored in the first storage 260 and executed under control of the first controller 270.

Figure 3:
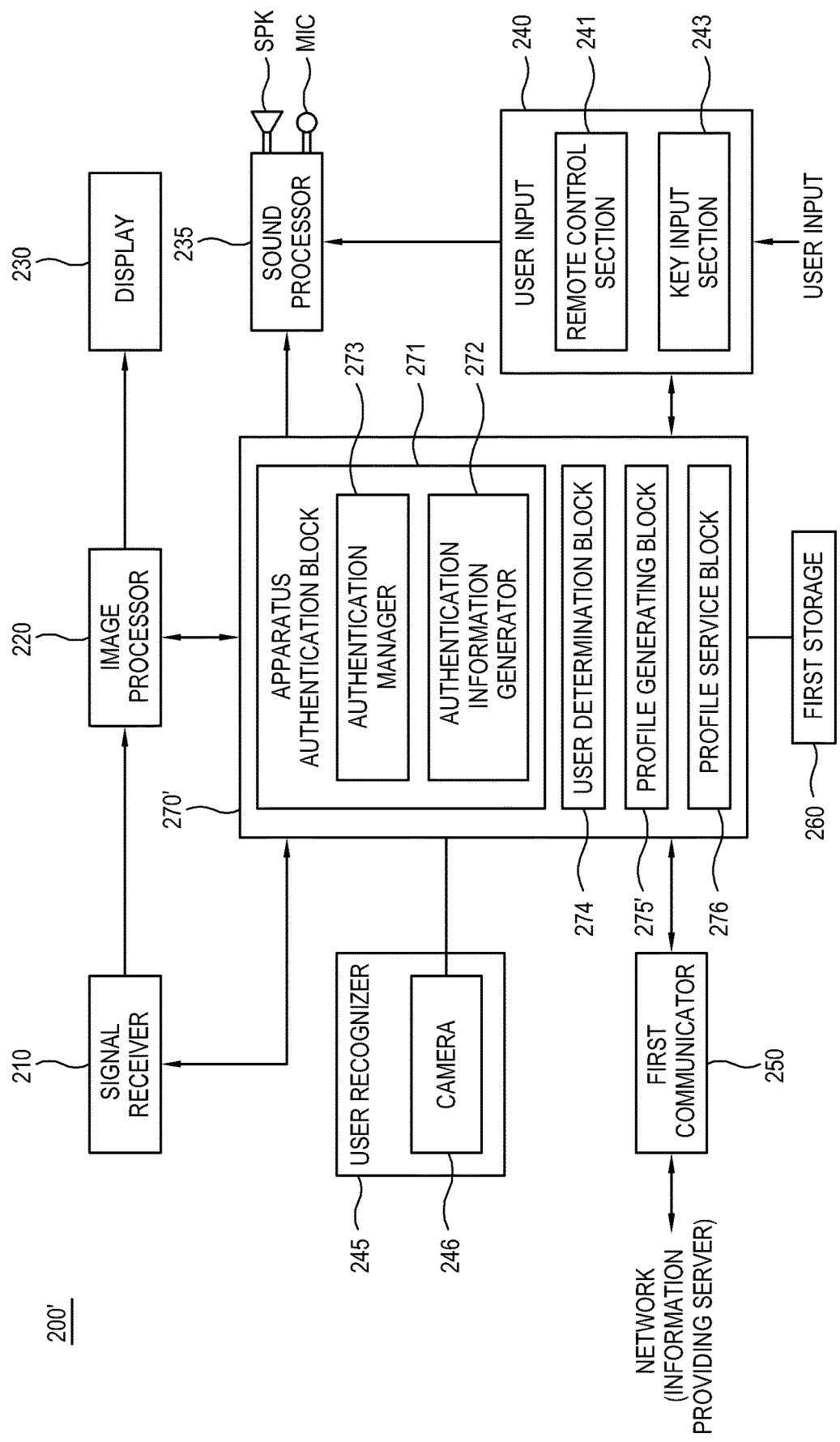
FIGS. 3 and 4 are block diagrams showing alternative examples of the display apparatus of FIG. 2.

In the foregoing, the first controller 270 controls the profile generating block 275 to generate the individual profiles and/or the group profile of the server account users based on the server information of the server account users provided from the information providing server 300, but not limited thereto. For example, as shown in FIG. 3, a first controller 270' of the display apparatus 200 may not generate the individual profiles and/or the group profile of the server account users in order to reduce operation load of a profile generating block 275'. At this time, the profile generating block 275' collects the situation information of the server account users, extracts the personalization data of the server account user from the collected situation information, and just requests the information providing server 300 to generate and transmit the individual profiles and/or the group profile of the server account users while transmitting the extracted personalization data and personal information of the server account users to the information providing server 300 through the first communicator 250. In this case, on the contrary to the second controller 340 of the information providing server 300 shown in FIG. 7, the second controller 340' of the information providing server 300' shown in FIG. 8 may further include a profile generating block 344 having the same function as the profile generating block 275 for generating the individual profiles and/or the group profile of the server account users.

Figure 4:
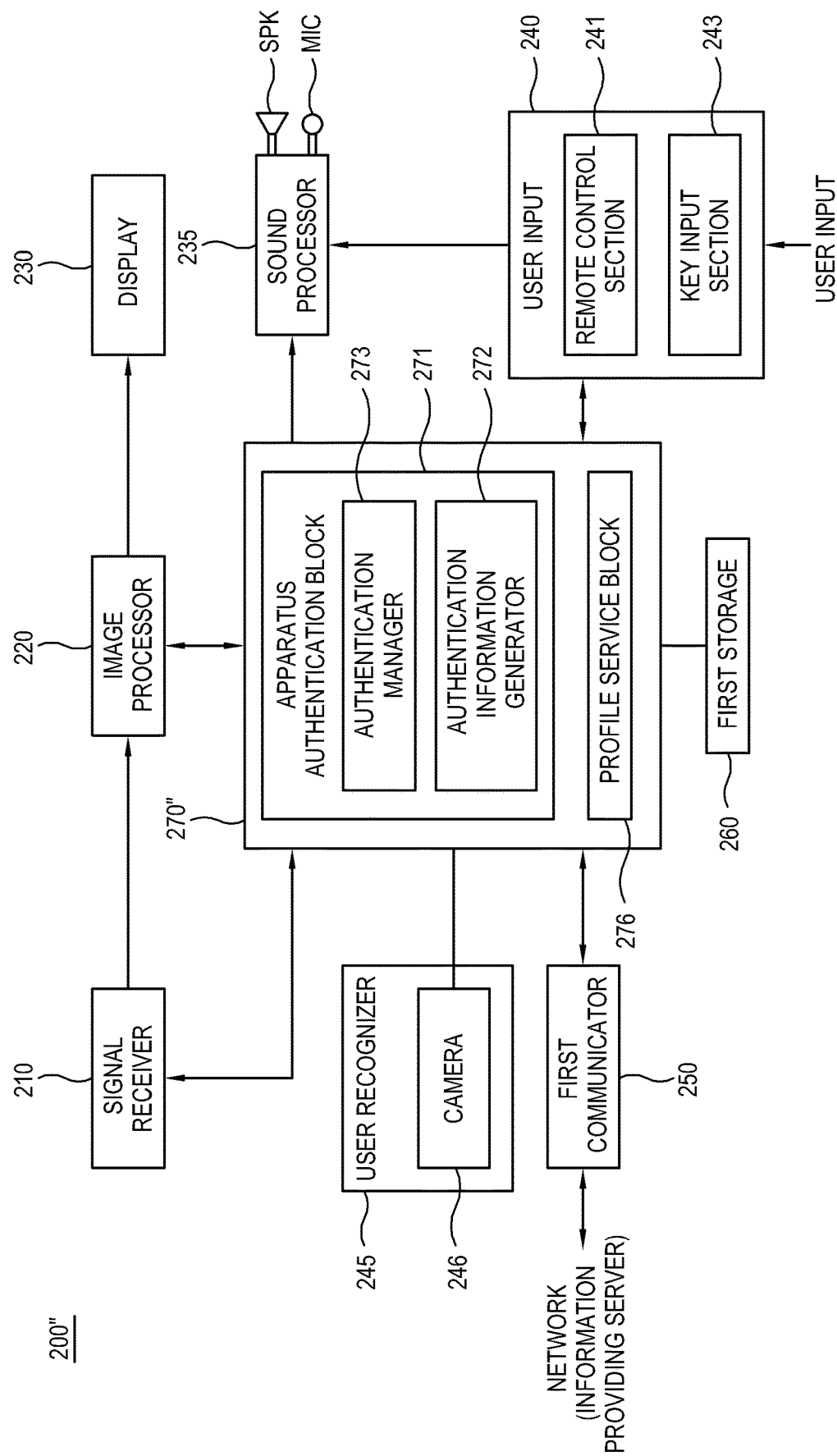

Alternatively, as shown in FIG. 4, a first controller 270" of the display apparatus 200" may not include all of the user determination block 274 and the profile generating block 275 in order to reduce the operation load.

At this time, the profile service block 276 requests the information providing server 300 to generate and transmit the server information involving the personalization information of the corresponding server account user and the server account user profile/the general user profile and/or the group profile of the individual profiles of the corresponding server account users, while transmitting the image data of the current users from the camera 246 of the user recognizer 245 and the personalization data and the personal information of the server account users extracted from the situation information, to the information providing server 300.

Also, the profile service block 276 receives the server information involving the personalization information of the corresponding server account user and the server account user profile/the general user profile of the individual profiles and/or the group profile of the corresponding server account users, from the information providing server 300 and displays the requested information based on the server account user profile/the general user profile of the individual profiles and/or the group profile received, in the form of a preset displaying type when the current user makes a request for the information.

Figure 9:
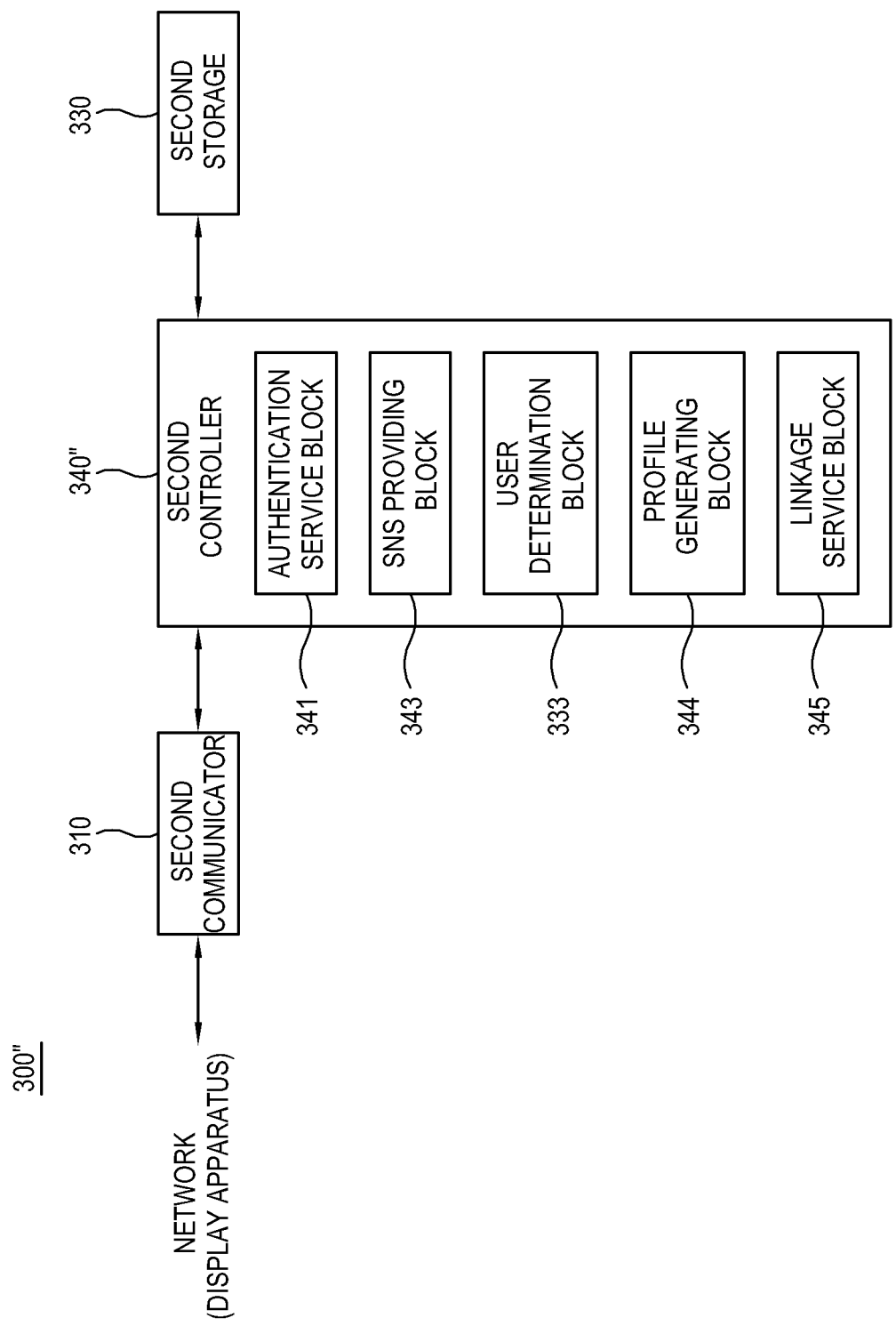

In this case, as shown in FIG. 9, a second controller 340" of an information providing server 300" may further include a user determination block 333 and a profile generating block 344 having the same functions as the user determination block 274 and the profile generating block 275, respectively.

Below, a process of providing information in the display apparatus 200 with the foregoing configuration according to an exemplary embodiment will be described with reference to FIGS. 5 and 6.

First, if the current user who is viewing or using the display apparatus 200 is a single user, an operation of providing the personalization information without a user's direct authentication and login procedure will be described with reference to FIG. 5.

After the display apparatus 200 logs in to the information providing server 300, the apparatus authentication block 271 of the first controller 270 requests the reference recognition information for determining whether the current user is the server account user having the information sharing relation with the display apparatus 200, to the information providing server 300 through the first communicator 250, and stores the reference recognition information received from the information providing server 300 in the first storage 260 (S100). The reference recognition information may involve photo image data including face images of the server account users and server account ID and/or user names for distinguishing the photo image data of the server account users.

Alternatively, the reference recognition information may be provided from the information providing server 300 in response to the request of a user such as a manager of the display apparatus 200, and then stored. Also, the reference recognition information may be updated at intervals of second predetermined time, for example, three-hourly and/or in response to a user's request under control of the apparatus authentication block 271.

Figure 26:
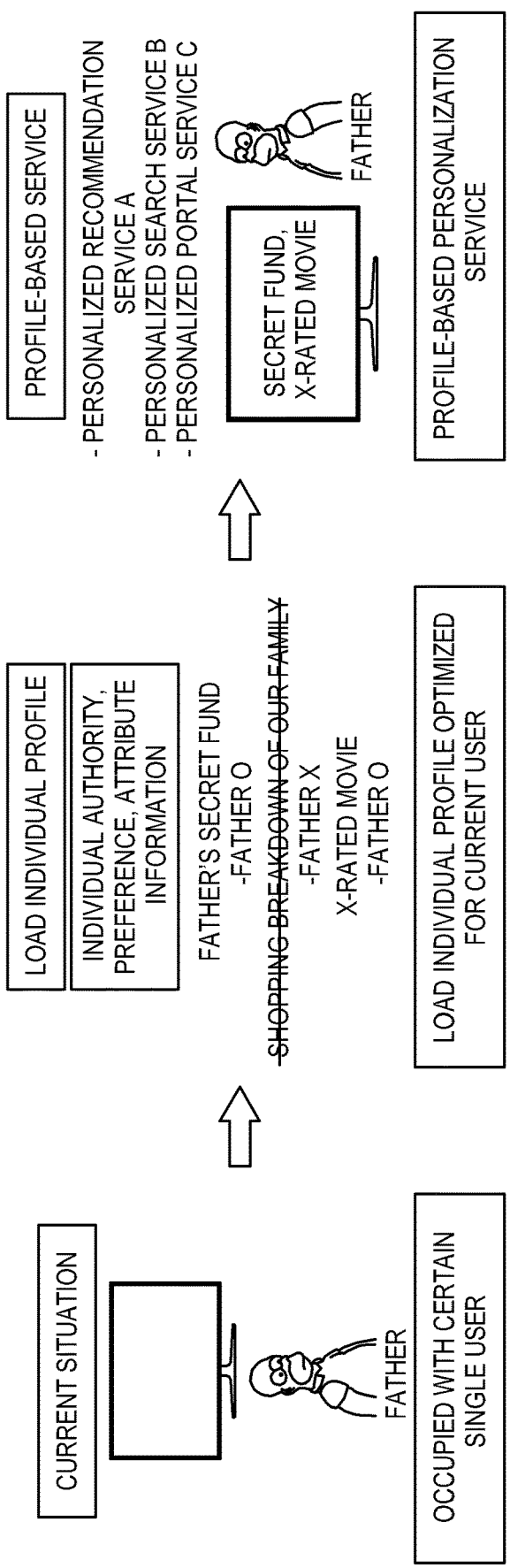
FIG. 26 is a schematic view for explaining the personalization information providing process of the display apparatus of FIG. 5.

Then, as shown in FIG. 26, the user determination block 274 of the first controller 270 obtains an image including a face image, i.e., the recognition information of the current user (e.g., a father) who is viewing or using the display apparatus 200, photographed through the user recognizer 245, for example, the camera 246 (S110).

Next, the user determination block 274 determines the server account user corresponding to the current user by comparing the image involving the face image of the current user with the face image of the reference recognition information of the server account users stored in the first storage 260, and stores the determination result in the first storage 260 (S120). At this time, the user determination block 274 may determine the current user as the definite server account user or the general user in accordance with the accuracy of user determination, that is, in accordance with the matching rates between the face image of the obtained image of the current user and the face image of the reference recognition information of the server account users. Also, the user determination block 274 determines whether the current user is a single user.

Then, the user determination block 274 may determine whether the current user is the server account user by the same method using the camera 246 of the user recognizer 245 at intervals of first predetermined time, e.g., a half-hourly, and updates the determination results stored in the first storage 260.

Then, the profile generating block 275 of the first controller 270 requests the server information involving the personalization information about the corresponding server account user, to the information providing server 300 while sending the information providing server 300, the personalization data extracted from the situation information of the corresponding server account user and the personal information of the server account user corresponding to the current user (a father) stored in the first storage 260 through the first communicator 250, and receives the server information searched and collected based on the personalization data of the corresponding server account user in the information providing server 300 from the information providing server 300 (S130). At this time, the profile generating block 275 may request and receive the server information about the corresponding server account user to and from the information providing server 300 at intervals of third predetermined time, for example, six-hourly.

Then, the profile generating block 275 generates the server account user profile and the general user profile of the individual profiles of the corresponding server account user (e.g., a father) as described above, based on the personalization information of the server information received from the information providing server 300, and stores it together with the personalization information in the first storage 260 (S140).

Then, if the current user selects an item of 'login without authentication' on a screen or window (not shown) for logging in to the personalization/aggregation function, the profile service block 276 of the first controller 270 displays a scene or sub-window of showing the personalization/aggregation information provided by the display apparatus 200, on the display 230 without any substantive user authentication and login procedure.

At this time, the screen or window for logging in to the personalization/aggregation function may further include an item of login with authentication in addition to the item of 'login without authentication' If the item of 'login with authentication' is selected, a user logs in to the user account for personalization designated for him/her through a login authentication procedure such as the authenticode input method of inputting an ID and a password as in the past, and is thus allowed to use the personalization functions provided by the display apparatus 200.

Then, in order to use the personalization function, for example, the 'personalization content view' function, if the current user selects an item corresponding to the 'personalization content view' function through an input by the user input 240 on the scene or sub-window of showing the personalization/aggregation information, the profile service block 276 selects only information matching with the server account user profile or the general user profile of the corresponding server account user stored in the first storage 260 in accordance with the results of determining the server account user at the operation S120, among the personalization information of the corresponding server account user received from the information providing server 300 and updated and stored in the first storage 260 in response to a user request or at intervals of third predetermined time, and displays it on the display 230 (S150). At this time, the profile service block 276 may activate and display only items related to the personalization function, such as the item corresponding to the 'personalization content view' function on the personalization/aggregation information screen, since it is determined at the operation S120 that the current user is a single user.

If it is determined at the operation S120 that the current user is the definite server account user, the profile service block 276 displays only information matching with the server account user profile of the individual profiles of the corresponding server account user stored in the first storage 260, on the display 230.

On the other hand, if it is determined at the operation S120 that the current user is not the definite server account user but a general user, the profile service block 276 displays only information matching with the general user profile of the individual profiles stored in the first storage 260, on the display 230.

Next, if the current user who is viewing the display apparatus 200 is a group including a plurality of users, an operation of providing aggregation information without any substantive user authentication/login procedure will be described with reference to FIG. 6.

Figure 27:
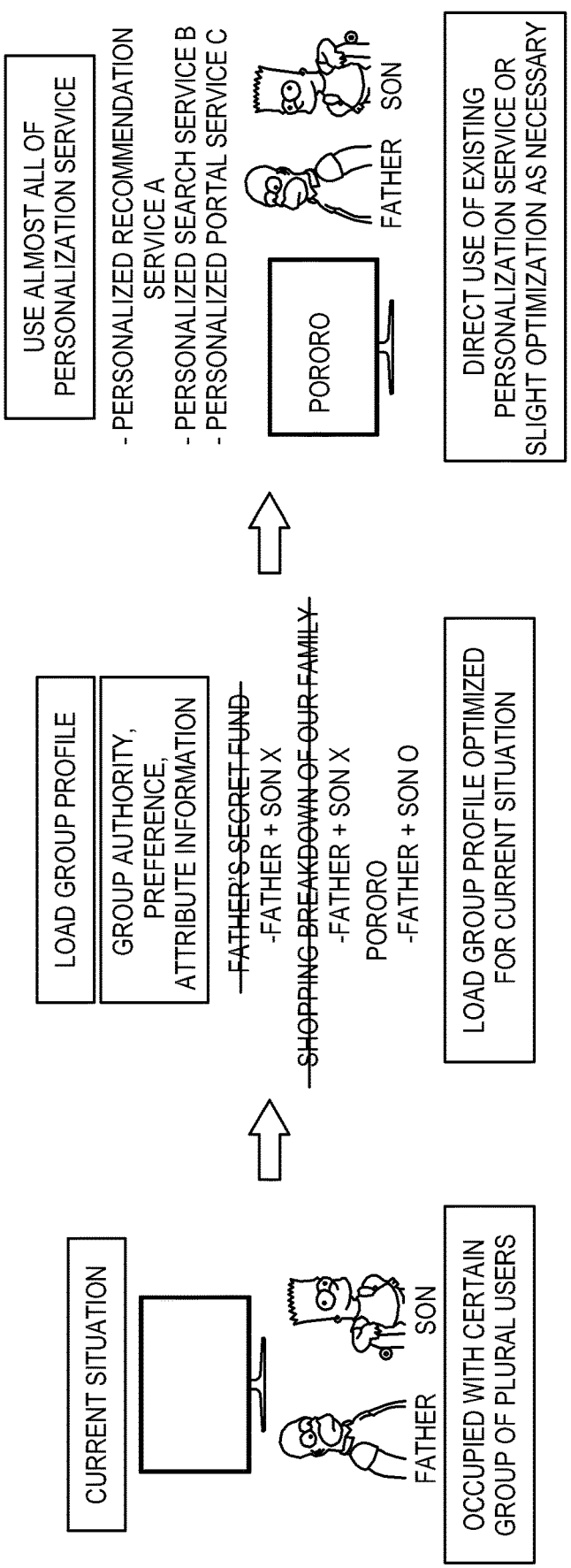
FIG. 27 is a schematic view for explaining the grouping information providing process of the display apparatus of FIG. 6.

The operations of providing the aggregation information by the display apparatus 200 is the same as the operations described with reference to FIG. 5, except that operations S100-S130' are performed for the plurality of users (e.g., father and son) who are viewing the display apparatus 200 as shown in FIG. 27, and operations S140'-S150' generate a group profile for corresponding server account users based on personalization information of the server information, and display information matching with the generated group profile among personalization information of the corresponding server account users when one among the current users selects an item corresponding to an aggregation function, e.g., an 'aggregation content view' function.

Therefore, only the operations S140'-S150' for providing the aggregation information to the display apparatus 200 will be described.

After receiving server information in the operation S130', the profile generating block 275 of the first controller 270 generates the group profile for the corresponding server account users based on the personalization information of the received server information, and stores the generated group profile together with the personalization information of the received server information in the first storage 260 (S140').

That is, the profile generating block 275 generates the group profile including the profile information selected to be optimized for the group of current users in consideration of the authority, preference, and/or characteristic of users from the personalization information of the server information received from the information providing server 300, and stores the generated group profile together with the personalization information of the received server information in the first storage 260.

Then, in order to use the aggregation function, for example, the 'aggregation content view' function, if one among the plurality of users selects an item corresponding to the 'aggregation content view' function on the personalization/aggregation information screen, the profile service block 276 selects information matching with the generated group profile among the personalization information of the corresponding server account users stored in the first storage 260 and displays it on the display 230 (S150'). At this time, the profile service block 276 may activate and display only the items related to the aggregation function, such as the item corresponding to the 'aggregation content view' function on the scene or sub-window of showing the personalization/aggregation information, since it is determines at the operation S120 that the current user is determined as the group user including the plurality of users.

In the foregoing, the operations of the display apparatus 200 according to an exemplary embodiment are explained as being divided into the operation of providing the personalization information and the operation of providing the aggregation information, but not limited thereto. For example, if the user determination block 274 determines that the current user is changed while performing the operation of providing the personalization information or the operation of providing the aggregation information, the profile generating block 275 and the profile service block 276 may switch from the operations S130-S150 or S130'-S150' to the operations S130'-S150' or S130-S150 in accordance with the number of changed current users.

Figure 7:
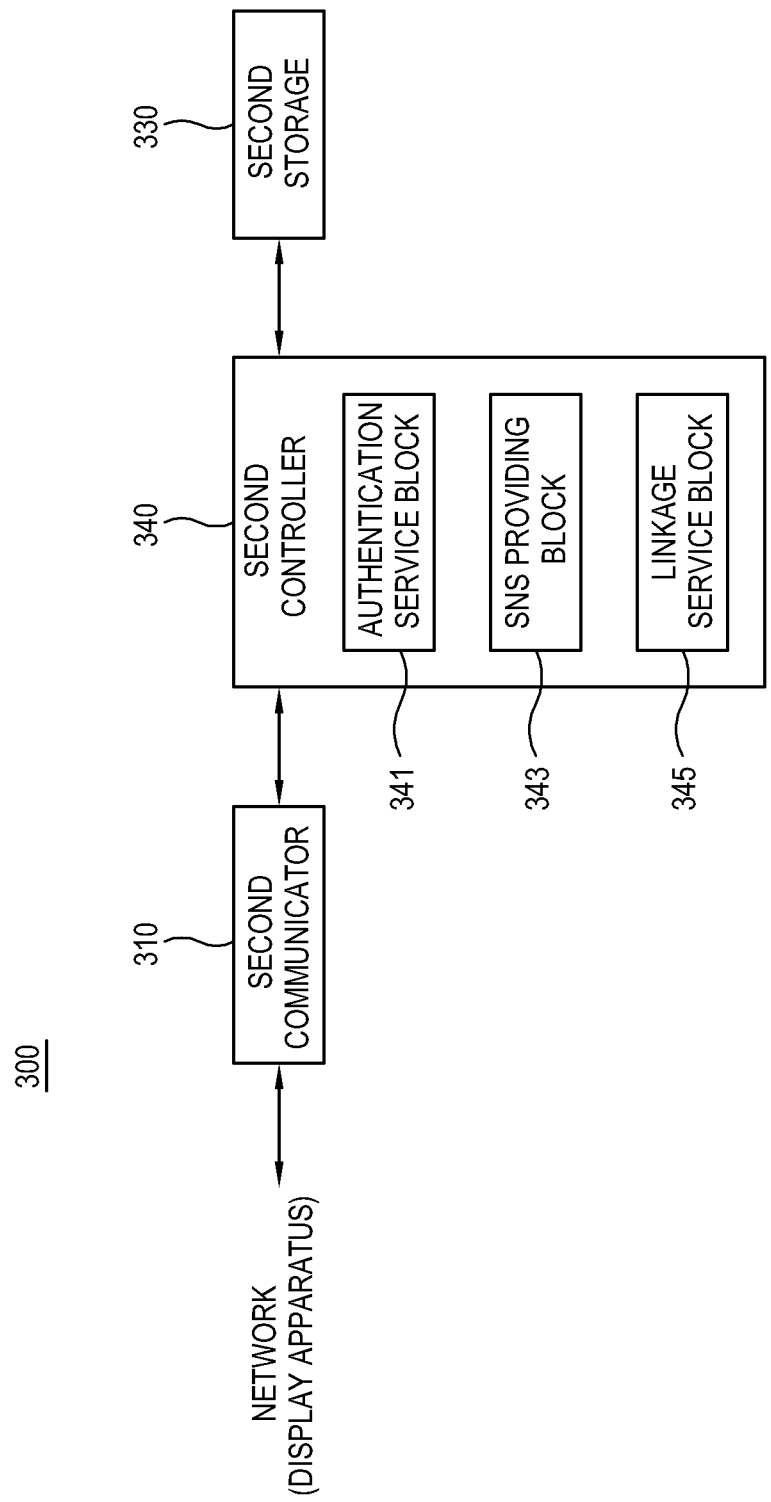
FIG. 7 is a block diagram of the information providing server according to an exemplary embodiment applied to the display system of FIG. 1.

FIG. 7 is a block diagram showing the information providing server 300 according to an exemplary embodiment.

The information providing server 300 is a server connected to the network 110 and providing a predetermined information sharing service to the remote display apparatus 200, which analyzes the personal information and the personalization data of the corresponding server account user received along with the request for the server information of the server account user corresponding to the current user from the display apparatus 200, and searches concerned content, i.e., personalization information corresponding to the personalization data of the corresponding server account user in accordance with a predetermined algorithm, thereby transmitting the searched personalization information to the display apparatus 200.

Figure 28:
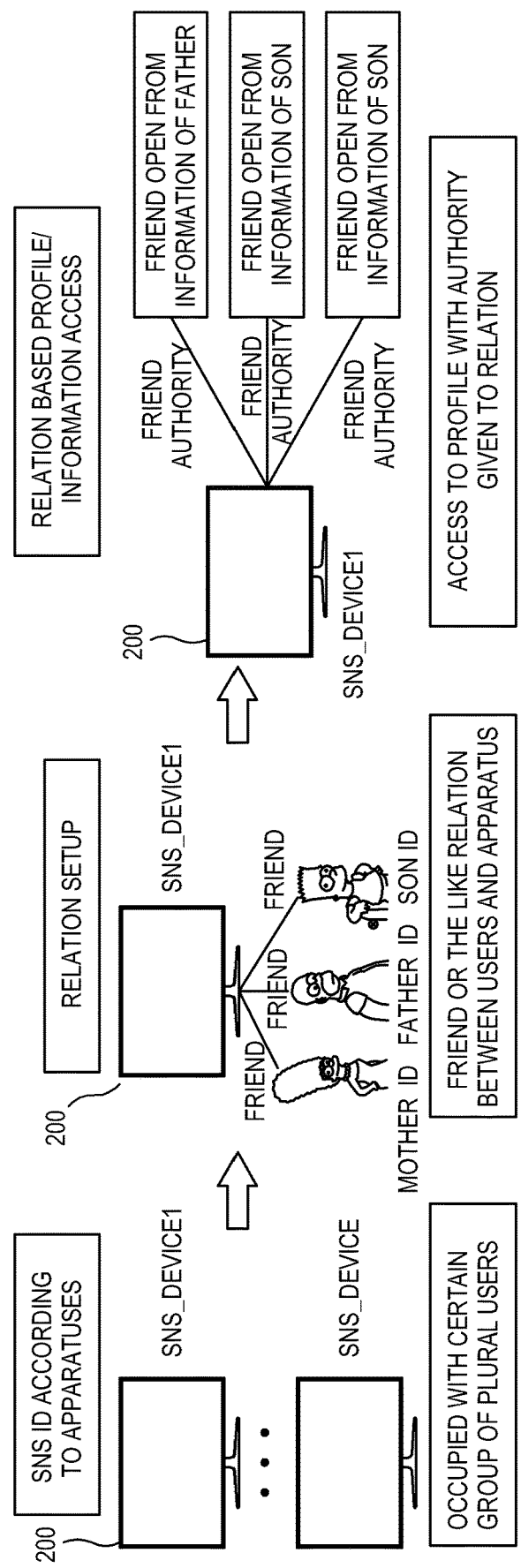
FIG. 28 is a view showing an information sharing relation between the display apparatus and server account users in the information providing server of FIG. 7.

As shown in FIG. 28, the information providing server 300 may be achieved by a social network service (SNS) server that shares various pieces of information through connection based on the information sharing relation such as the 'friend' or the like between a server account device, i.e., the display apparatus 200 and the server account user On the contrary to a conventional SNS providing server such as Twitter, Facebook, etc. where the information sharing relation can be set up only between the subscribed server account users, the information providing server 300 is configured to set up connection based on the information sharing relation even between the display apparatuses 200 subscribed as the server account device and the server account users. Therefore, the information providing server 300 can connect the display apparatus 200 with the server account users related to the display apparatus 200 through the information sharing relation, and provide information sharing through the SNS between them, an information searching function in connection with Google, Naver or the like portal site, an entertainment function in connection with a game site or the like, and so on.

Also, the information providing server 300 may share information between the display apparatus 200 and the server account users by setting up specific information to be opened or closed, or by setting up specific information to be opened or closed to a specific server account user and/or display apparatus in addition to sharing the information with the specific server account user and/or display apparatus connected through the information sharing relation.

Figure 29:
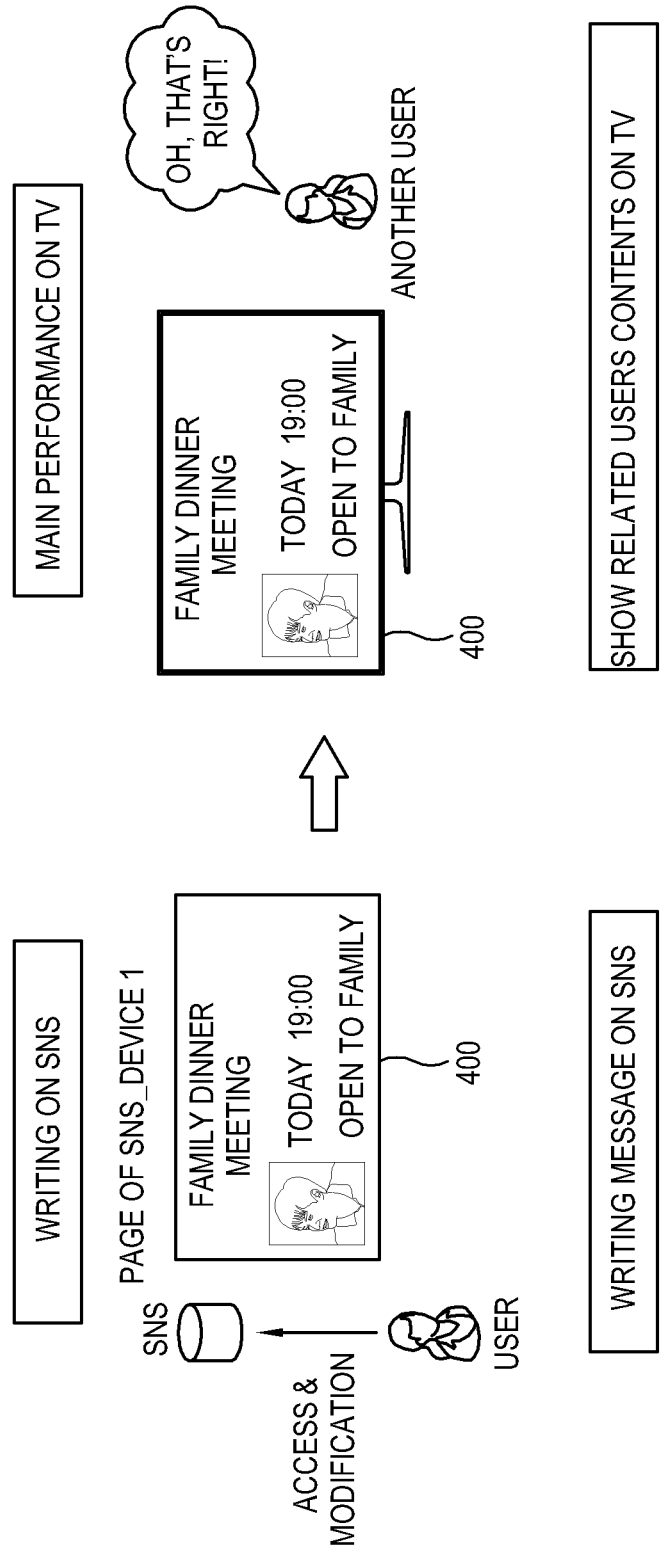
FIGS. 29 and 30 showing examples of sharing information between the server account users and the display apparatus.
Figure 30:
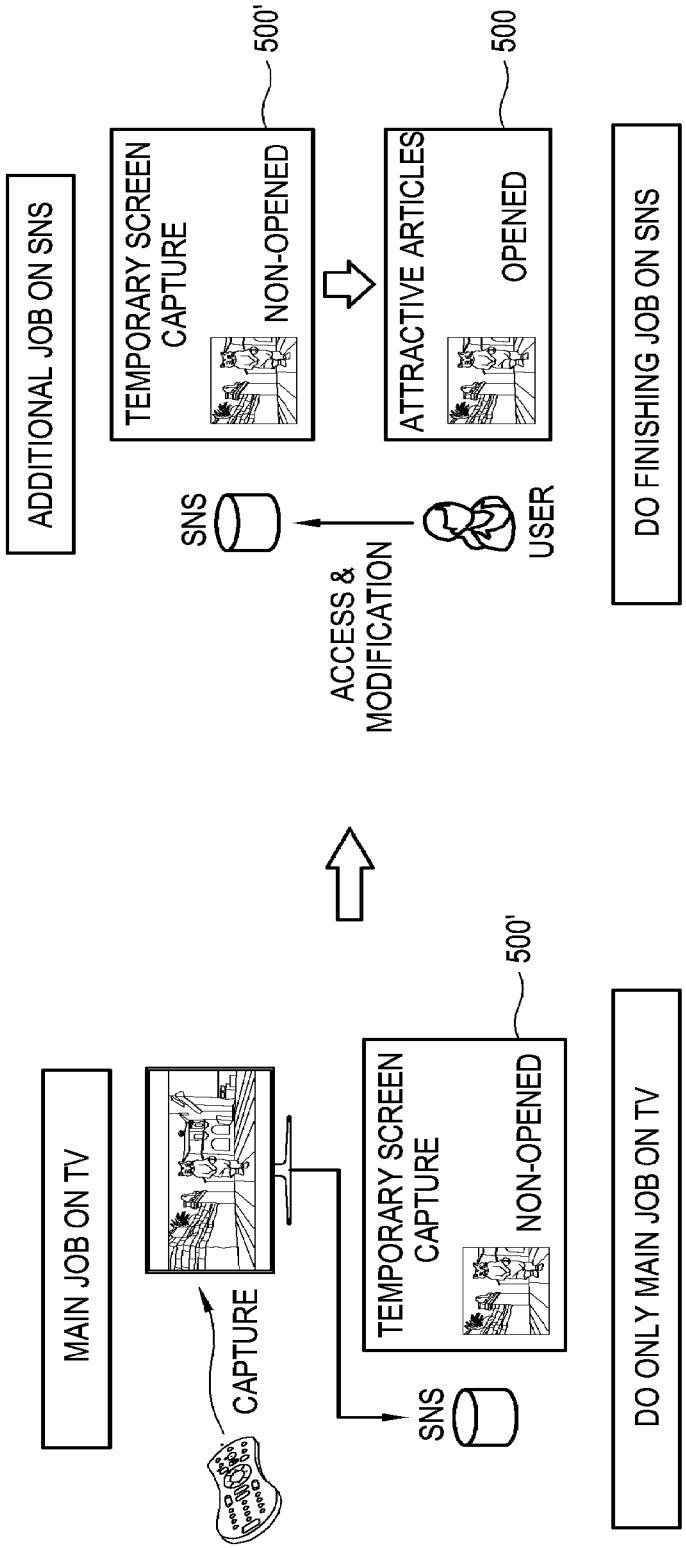

For example, when a reminder message for reminding a family schedule, etc. or a posting including a photograph is composed through the existing display apparatus, it is not only difficult to compose the reminder message or the posting through the remote control section 241 or the like of the user input 240, but also hard to transmit the reminder message or the posting even if the reminder message or the posting has been composed. On the other hand, according to an exemplary embodiment, in the case where the information sharing function is used between the display apparatus 200 and the server account users and the reminder message is composed as shown in FIG. 29, if a user, e.g., a father can log in to the information providing server 300 through an SNS application of the portable terminal, compose the reminder message and then set up 'open to family', the plurality of current users having family relations with the father, for example, mother and son can use the display apparatus 200 to check up the reminder message through the group profile displayed on the display 230 when using the personalization/aggregation information providing function. Also, as shown in FIG. 30, in the case where a posting with a photograph is composed, if a user performs a main job, for example, capturing a need screen in the display apparatus 200 and sets up 'closed or non-opened' after composing a temporary posting in the server account of the corresponding user of the information providing server 300, she/he can log in to the information providing server 300 through the SNS application of the portable terminal and complete the posting, in the future.

As shown in FIG. 7, the information providing server 300 includes the second communicator 310, the second storage 330, and the second controller 340.

The second communicator 310 performs communication with the first communicator 250 of the display apparatus 200 through the network 110. Like the first communicator 250, the second communicator 310 may be achieved by a wired/wireless communication module for accessing the network 110.

The second communicator 310 receives the personal information and the personalization data of the corresponding server account user along with the request for the server information with regard to the corresponding server account user from the first communicator 250 of the display apparatus 200, and transmits the server information including the personalization information searched by the SNS providing block 343 based on the received personalization data, as will be described later, to the first communicator 250 of the display apparatus 200.

The second storage 330 stores a firmware or operating system as a control program for controlling the operations of the information providing server 300, and various pieces of data such as the search result data generated in accordance with the operations of the information providing server 300.

Also, the second storage 330 may store the account user personal information including a server account user name, server account ID, a password, sex, age, a photograph, sound, e-mail address, etc. input when the server account user or the server account device subscribes to the information providing server 300; the reference recognition information such as the photo image data and/or the sound data including the face image and/or sound input by the server account user through the authentication service block 341 to be described later; and reference authentication information for authenticating the display apparatus 200.

Also, the second storage 330 may store various contents generated as the server account users use an SNS function of the SNS providing block 343 and/or a linkage function of the linkage service block 345.

Like the first storage 260 of the display apparatus 200, the second storage 330 may be achieved by at least one storage medium of a flash memory type, a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The second controller 200 generally controls operations of the information providing server 300, and may include CPU and RAM in order to execute the firmware or operating system, i.e., the control program stored in the second storage 330.

Also, the second controller 200 includes the authentication service block 341, the SNS providing block 343, and the linkage service block 345.

The authentication service block 341 requests the authentication information to the display apparatus 200 through the second communicator 310 when the display apparatus 200 subscribes to the server account, compares the authentication information received from the apparatus authentication block 271 of the display apparatus 200 through the second communicator 310 with the reference authentication information, and authenticates the display apparatus 200 when they are matched with each other. The reference authentication information is the same as the authentication information received from the apparatus authentication block 271, and may include a unique ID of the display apparatus 200 given by the manufacturer of the display apparatus 200, the unique ID and an internal code key, or the unique ID and a production or serial number.

The authentication of the display apparatus 200 is performed only once when the display apparatus 200 subscribes and creates a server account to the information providing server 300 after being released. However, alternatively, the authentication of the display apparatus 200 may be omitted, or performed whenever the display apparatus 200 logs in.

The authentication service block 341 requests the server account information to the display apparatus 200 when the display apparatus 200 subscribes to the server account, and stores the server account information received from the apparatus authentication block 271 of the display apparatus 200 in the second storage 330. The server account information may include the server account ID and the password generated by the authentication information generator 272 of the apparatus authentication block 271.

Also, the authentication service block 341 compares the received server account information with the server account information stored in the second storage 330 when the display apparatus 200 requests for the login after subscribing to the server account, thereby determining to permit the login of the display apparatus 200.

Also, when the display apparatus 200 requests the reference recognition information about the server account users set up to have the information sharing relation with the display apparatus 200, the authentication service block 341 extracts reference recognition information of the corresponding server account users from the account user personal information stored in the second storage 330 and transmits the extracted information to the display apparatus 200 through the second communicator 310 while storing it in the second storage 330. The reference recognition information may include the photo image data including the face images of the corresponding server account users and/or the sound data including the sound of the corresponding server account users, and the server account user names and/or the server account ID for distinguishing the photo image data and/or the sound data between the corresponding server account users. The reference recognition information transmitted to the display apparatus 200 is stored in the first storage 260, and used by the user determination block 274 of the display apparatus 200 in determining whether or not the current user currently viewing display apparatus 200 is the server account user, as described above.

The SNS providing block 343 allows the display apparatus 200 and the server account user to be connected having the information sharing relation with each other, and provides SNS for sharing information between the display apparatus 200 and the server account users connected to have the information sharing relation with each other.

In more detail, when an administer or manager (for example, father) of the display apparatus 200 requests the 'friend' relation to a certain server account user (for example, mother, or son) of the information providing server 300 on a sharing relation setup screen or window of the operating system or execution program of the display apparatus 200, the SNS providing block 343 may display a check window for asking whether to accept the sharing relation (for example, "the display apparatus ○○○○ (the server account ID and/or the server account device name) made a request for the 'friend' relation. Will you accept? Yes or No") on the SNS application of the portable terminal of the certain server account user connected to the information providing server 300 through the second communicator 310, or may display the display apparatus 200 on a waiting list of a sharing relation setup screen or window on the SNS application, thereby allowing the corresponding server account user to set up the sharing relation with the display apparatus 200.

Also, when a certain server account user requests the friend relation to the display apparatus 200, the SNS providing block 343 may display a check window for asking whether to accept the sharing relation (for example, "the server account user ○○○○ (the server account ID and/or the server account user name) made a request for the 'friend' relation. Will you accept? Yes or No") on the sharing relation setup screen or window of the operating system or the execution program of the display apparatus 200, or may display the certain server account user on a waiting list of the sharing relation setup screen or window of the execution program, thereby allowing the manager of the corresponding display apparatus 200 to set up the sharing relation with the corresponding server account user.

In case that the display apparatus 200 and the server account user are connected having the 'friend' or the like information sharing relation with each other, the SNS providing block 343 may allow them to share (e.g., read, have a written reply, and copied and pasted, etc.) a document, a column, a published posting, etc. shown on a corresponding application, or may allow them to use an image reproduction or the like function of the corresponding application, within the scope of the 'friend' authority.

Also, if the SNS providing block 343 receives from the display apparatus 200, the request for the server information including the personalization information with regard to the server account users corresponding to the current users determined by the user recognizer 245 and the user determination block 274, together with the personal information and the personalization data of the corresponding server account users, the concerned content, that is, the personalization information of the corresponding server account users is searched from the contents stored in the second storage 330 based on the personalization data of the corresponding server account users, and the searched personalization information is transmitted to the display apparatus 200 through the second communicator 310 while being stored in the second storage 330.

At this time, the SNS providing block 343 may search the personalization information of the corresponding server account users when a user makes a request after the first search or at intervals of third predetermined time, for example, six-hourly, update the personalization information stored in the first storage 330 with the searched personalization information, and transmit it to the display apparatus 200.

When the server account users make a request for linkage about sites capable of having the linkage with the SNS providing block 343, the linkage service block 345 connects a site requested for linkage to the corresponding server account and allows the server account user requesting the linkage to share a document, a column, a published posting, etc. shown on the site requested for the linkage or to use search, game running, or the like function offered by the site requested for the linkage.

The authentication service block 342, the SNS providing block 343, and the linkage service block 345 may be achieved by an application-specific integrated circuit (ASIC) designed to include execution programs having their corresponding functions.

Alternatively, the authentication service block 342, the SNS providing block 343, and the linkage service block 345 may be achieved by not the ASIC but execution programs having their corresponding functions. In this case, the execution program is stored in the second storage 330 and executed under control of the second controller 340.

Also, the authentication service block 342, the SNS providing block 343, and the linkage service block 345 may be achieved by independent servers connected to one another by a wire or wirelessly.

Figure 8:
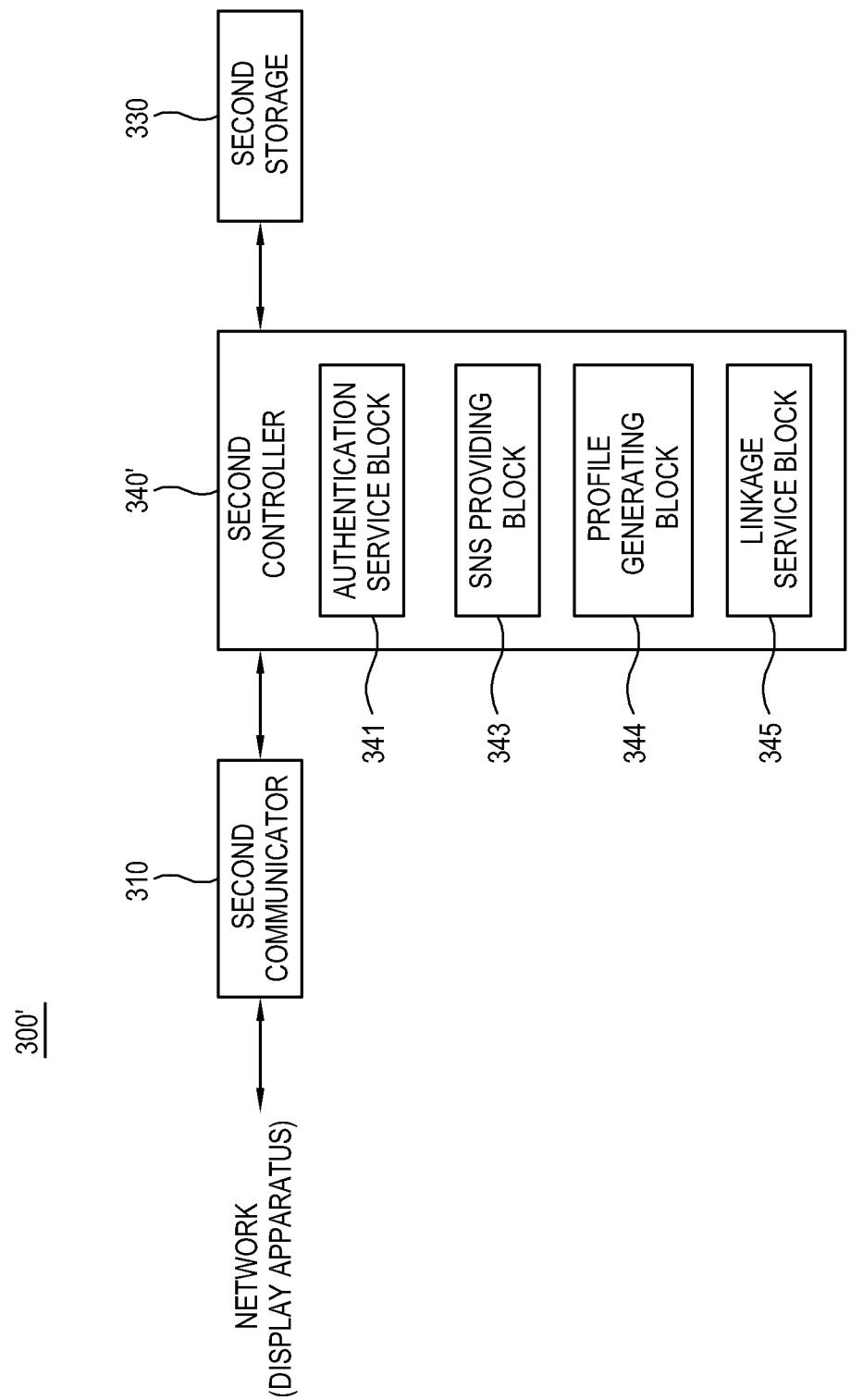
FIGS. 8 and 9 are block diagrams showing alternative examples of the information providing server of FIG. 7.

Alternatively, if the profile generating block 275' of the first controller 270' is configured not to have the function of generating the individual profiles and/or the group profile of the server account users as described above with reference to FIG. 3, the information providing server 300' may further include a profile generating block 344 as shown in FIG. 8. If receiving the personalization data extracted from the situation information by the profile generating block 275 together with the request for the server information including the personalization information about the corresponding server account users determined by the user determination block 274 from the display apparatus 200, the profile generating block 344 generates the individual profiles and/or the group profile based on the personalization information searched by the SNS providing block 343 in accordance with the received personalization data, and transmits it to the display apparatus 200 through the second communicator 310. The profile generating block 344 may be achieved as being involved in the second controller 340 as shown in FIG. 8, or may be achieved by a separate server. Such a configuration and operations of the profile generating block 344 are the same as the profile generating block 275 of the first controller 270 as shown in FIG. 2. Therefore, repetitive descriptions thereof will be avoided.

Also, if the first controller 270" of the display apparatus 200" is configured not to include both the user determination block 274 and the profile generating block 275 as described with reference to FIG. 4, the second controller 340" of the information providing server 300 may further include a user determination block 333 and a profile generating block 344 respectively capable of performing the same functions as the user determination block 274 and the profile generating block 275 as shown in FIG. 9. The user determination block 333 and the profile generating block 344 have the same configuration and operations as the user determination block 274 and the profile generating block 275 of the first controller 270 shown in FIG. 2. Therefore, repetitive descriptions thereof will be avoided herein.

Below, an information providing process of the information providing server 300 with the foregoing configuration according to an exemplary embodiment will be described with reference to FIGS. 7 and 10.

First, if receiving server account information along with a request for login through the second communicator 310 from the apparatus authentication block 271 of the display apparatus 200, the authentication service block 341 of the second controller 340 compares the received server account information with server account information stored in the first storage 330 when the display apparatus 200 subscribes, and permits login if they are matched with each other (S200).

Then, if the display apparatus 200 requests reference recognition information about the server account users having the information sharing relation with the display apparatus 200, the authentication service block 341 transmits the reference recognition information stored in the second storage 330 to the display apparatus 200 through the second communicator 310 (S210). At this time, if the reference recognition information has been stored in the second storage 330 before the second predetermined time, for example, before three hours, the authentication service block 341 newly extracts the corresponding reference recognition information of the server account users from the account user personal information stored in the second storage 330, and transmits the extracted reference recognition information to the display apparatus 200 while updating and storing it in the second storage 330.

Thereafter, the SNS providing block 343 receives personal information and personalization data of the corresponding server account users along with a request for the server information involving personalization information about the server account users corresponding to the current users from the display apparatus 200 (S220).

The SNS providing block 343 determines the corresponding server account users set up to have the information sharing relation with the display apparatus 200 based on the personal information of the received corresponding server account users (S230).

As a result of the determination in the operation S230, if the corresponding server account users have been set up to have the information sharing relation, the SNS providing block 343 uses the corresponding personalization data to search and collect the concerned content of the server account users, that is, the personalization information, and transmits the server information involving the collected personalization information to the display apparatus 200 while storing it in the first storage 330 (S240).

At this time, the SNS providing block 343 searches the personalization information of the corresponding server account user at intervals of the third predetermined time, for example, six hourly, and transmits it to the display apparatus 200 while updating and storing the searched personalization information in the display apparatus 200.

On the other hand, as a result of the determination in the operation S230, if the corresponding server account users have not been set up to have the information sharing relation with the display apparatus 200 due to change in the information or do not subscribe to the information providing server 300, the SNS providing block 343 transmits a check message that the corresponding server account user has not been set up to have the information sharing relation with the display apparatus 200 or does not subscribe to the information providing server 300, and/or a guide message for guiding the information sharing setup, subscription to the information providing server, etc. to the display apparatus 200 through the second communicator 310, thereby displaying the message on the display 230 through the control program of the display apparatus 200 (S250). At this time, the SNS providing block 343 may transmit the check message that the information sharing relation with the display apparatus 200 has not been set up to the portable terminal of the corresponding server account user through the second communicator 310, and display it on a display (not shown) of the portable terminal through an SNS execution program of the portable terminal.

Then, if the corresponding server account user checks the message through the display 230, accesses the information providing server 300 through the SNS application of the portable terminal, and subscribes to the information providing server 300 and/or sets up the information sharing relation with the display apparatus 200, the SNS providing block 343 performs the operation S240.

Below, the information providing process of the display system 100 including the display apparatus 200 and the information providing server 300 with the foregoing configurations according to an exemplary embodiment will be described with reference to FIGS. 11 and 12.

First, in case that a user who is viewing or using the current display apparatus 200 is a single user, the operation of the display system 100 providing the personalization information without a user's direct authentication and login procedure will be described with reference to FIG. 11.

Figure 11:
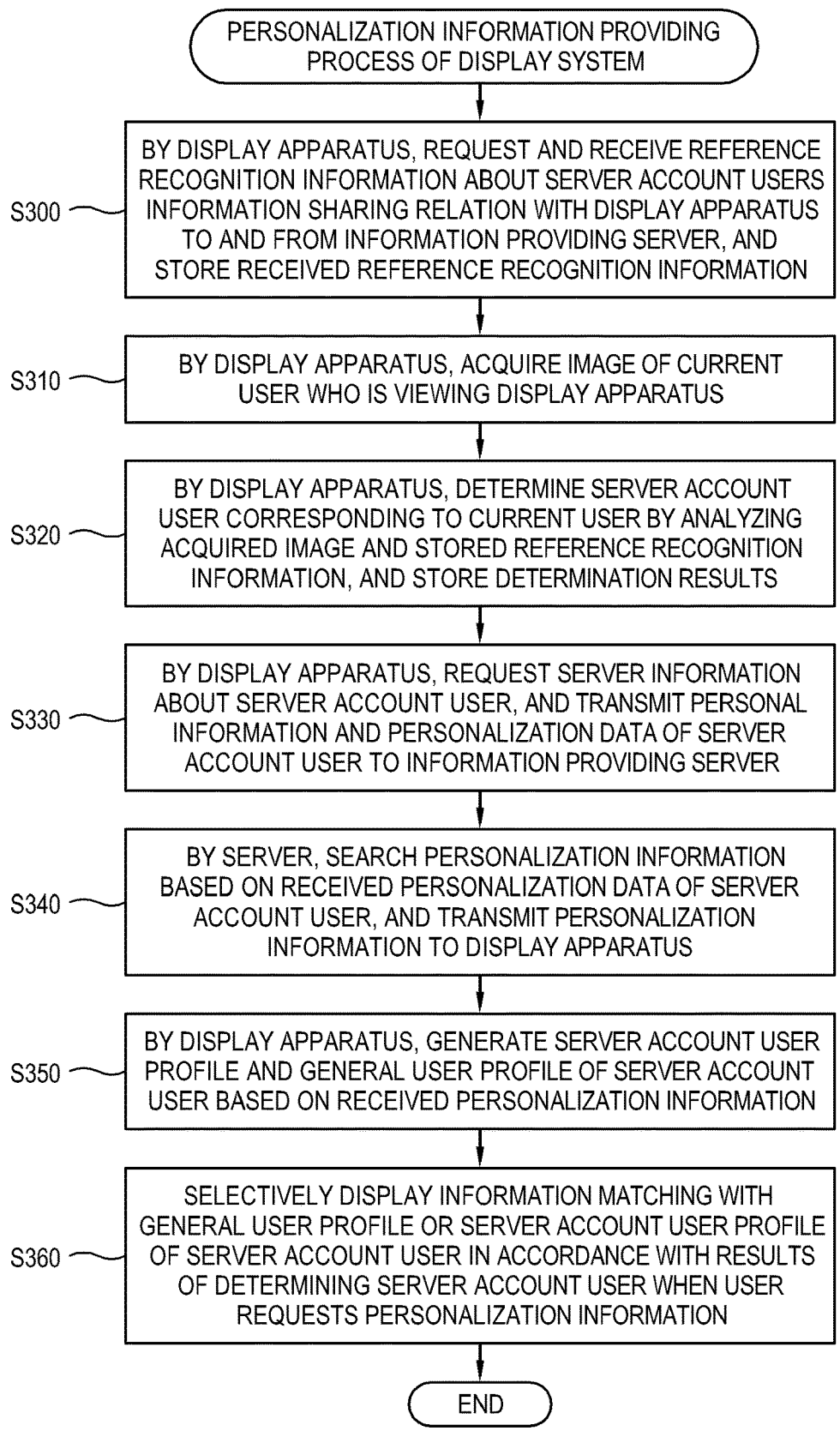
FIG. 11 is a flowchart showing a personalization information providing process of the display system according to an exemplary embodiment.

As shown in FIG. 11, if the display apparatus 200 first logs in to the information providing server 300 and then the apparatus authentication block 271 of the first controller 270 makes a request for the reference recognition information about server account users who are set up to have the information sharing relation with the display apparatus 200, the authentication service block 341 of the second controller 340 transmits reference recognition information stored in the second storage 330 to the display apparatus 200 through the second communicator 310, and the apparatus authentication block 271 stores the received reference recognition information in the first storage 260 (S300).

Then, the user determination block 274 of the first controller 270 photographs and acquires an image involving a face image of the current user who is viewing the display apparatus 200, through the user recognizer 245, for example, the camera 246 (S310).

Next, the user determination block 274 determines a server account user corresponding to the current user by comparing the image involving the face image of the users with the face images of the server account users of the reference recognition information stored in the first storage 260, and stores a determination result in the first storage 260 (S320). At this time, as shown in FIG. 3 and FIG. 9, if the user determination block 333 of the second controller 340" has the function of determining the server account user, the user determination block 274 transmits the image involving the face images of the users to the second controller 340", and the user determination block 333 of the second controller 340" determines the server account user corresponding to the current user by comparing the received image with the face images of the server account users of the reference recognition information stored in the second storage 330, and transmits the determination result to the profile generating block 344 while storing it in the second storage 330 so that the profile generating block 344 can generate a sever account user profile and a general user profile of individual profiles of the corresponding server account user.

Then, the profile generating block 275 of the first controller 270 requests the server information involving the personalization information about the corresponding server account user stored in the first storage 260 through the first communicator 250, and at the same time transmits the personal information of the corresponding server account user and the personalization data extracted from the situation information of the corresponding server account user to the information providing server 300 (S330).

Figure 10:
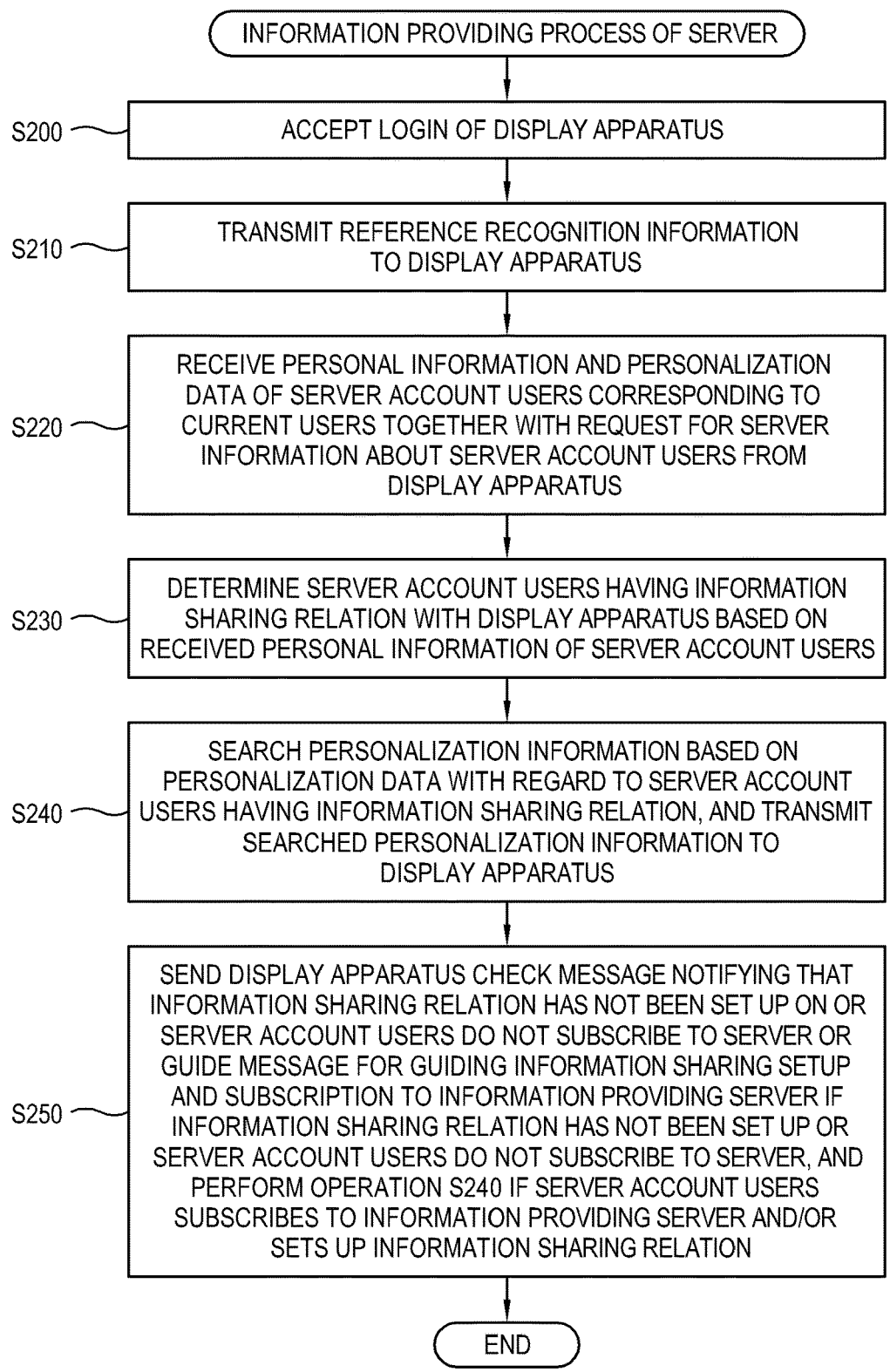
FIG. 10 is a flowchart showing an information providing process of the information providing server of FIG. 7.

The SNS providing block 343 of the second controller 34 searches the personalization information based on the personalization data of the corresponding server account user received by the same method as the operations S230-S250 of FIG. 10, and transmits the searched personalization information to the display apparatus 200 while storing it as the server information of the corresponding server account user in the second storage 330 (S340).

The profile generating block 275 generates the individual profiles of the corresponding server account user including the server account user profile and the general user profile based on the personalization information received from the information providing server 300, and stores it together with the received personalization information in the first storage 260 (S350). At this time, as shown in FIG. 3 and FIG. 9, if the function of generating the individual profiles is provided in not the profile generating block 275' of the first controller 270' but the profile generating block 344 of the second controller 340', the server account user profile and the general user profile of the corresponding server account user are generated by not the profile generating block 275' but the profile generating block 344 of the second controller 340' and then transmitted to the profile generating block 275'.

Then, if the current user selects an item of 'login without authentication' for login without any substantive user authentication and login procedure on the screen or window for logging in to the personalization/aggregation function, the profile service block 276 of the first controller 270 displays a scene or sub-window of showing the personalization/aggregation information provided by the display apparatus 200, on the display 230.

Then, in order to use the personalization function, for example, the 'personalization content view', if the current user selects the item corresponding to the 'personalization content view' function on the scene or sub-window of showing the personalization/aggregation information, the profile service block 276 selects only the information matching with the server account user profile or the general user profile of the corresponding server account user stored in the first storage 260 in accordance with the results of determining the server account user in the operation S320, among the personalization information of the corresponding server account user stored in the first storage 260, and displays the selected information on the display 230 (S360).

For example, if it is determined in the operation S320 that the current user is the definite server account user, the profile service block 276 displays only the information, which matches with the server account user profile of the corresponding server account user stored in the first storage 260 among the personalization information of the corresponding server account user, on the display 230.

On the other hand, if it is determined in the operation S320 that the current user is not the server account user but a general user, the profile service block 276 displays only the information matching with the general user profile stored in the first storage 260 among personalization information of the corresponding server account user on the display 230.

Next, in the case where the current user who is viewing or using the display apparatus 200 is a group user including a plurality of users, operations of the display system 100 providing aggregation information without any substantive user authentication/login procedure will be described below with reference to FIG. 12.

Figure 12:
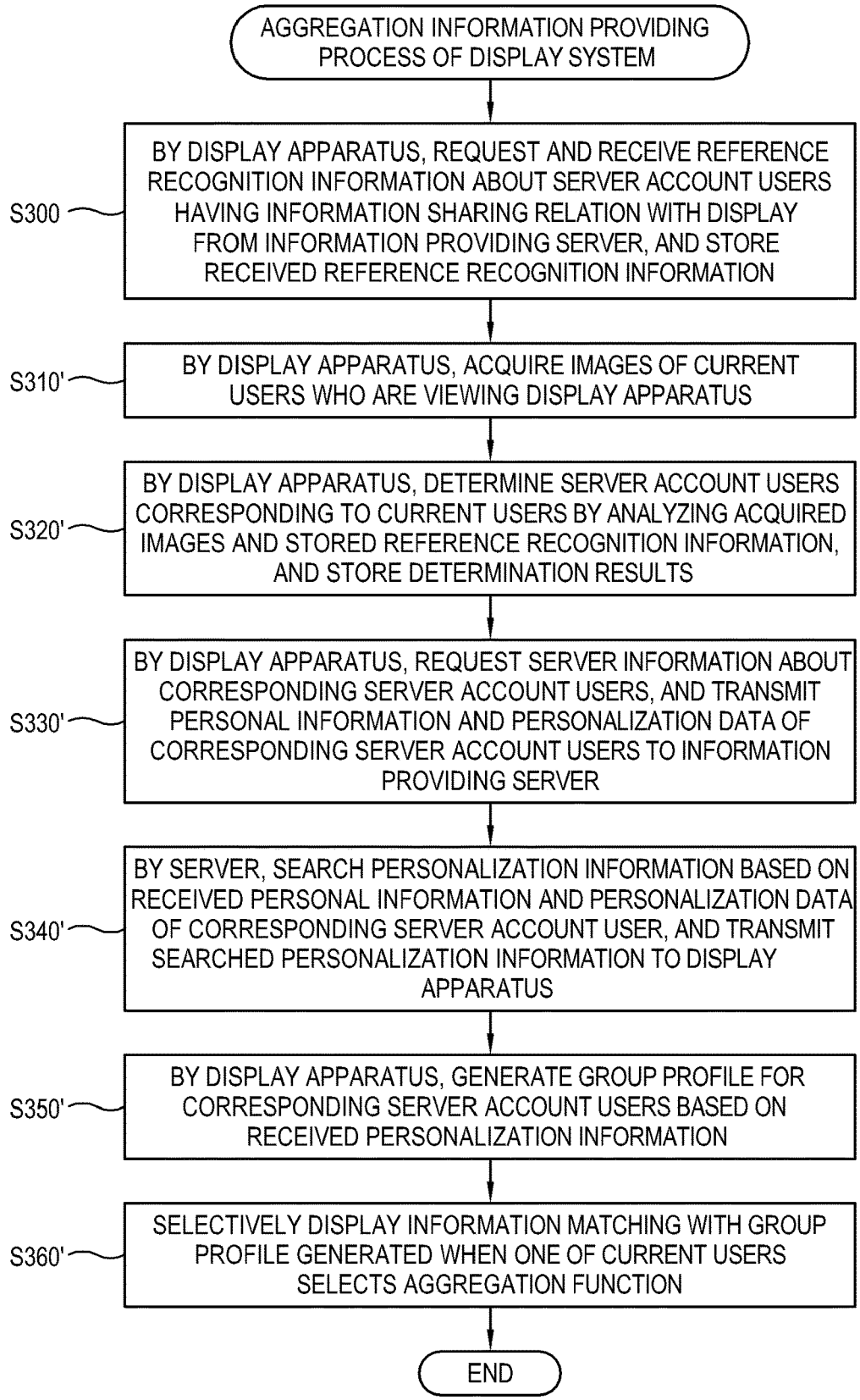
FIG. 12 is a flowchart showing a grouping information providing process of the display system according to an exemplary embodiment.

As shown in FIG. 12, the operations of the display apparatus 200 providing the aggregation information are the same as the operations of providing the personalization information described with reference to FIG. 11, where the operations are performed for the single user who is viewing the display apparatus 200, except that the operations S300-S340' are performed for the plurality of users who are viewing the display apparatus 200, and that operations S350'-S360' generate a group profile for the corresponding server account users based on the personalization information, and display only the information corresponding to the generated group profile among the personalization information of the corresponding server account users when one of the current users selects an item corresponding to am aggregation function, for example, an 'aggregation content view' function.

Also, the operations S350'-S360' are substantially the same as the operations
S140'-S150' of providing the grouping information by the display apparatus 200 described with reference to FIG. 6.

In the foregoing embodiments, the operations of the display system 100 are divided into the operations of providing the personalization information and the operations of providing the aggregation information, but not limited thereto. For example, if the user determination block 274 of the first controller 270 determines that the current user is changed while performing the operations of providing the personalization information or the operations of providing the aggregation information, the profile generating block 275 and the profile service block 276 of the first controller 270 and the SNS providing block 343 of the second controller 340 may switch from the operations S330-S360 or S330'-S360' to the operations S330'-S360' or S330-S360 in accordance with the number of changed current users.

As described above, in the display apparatus 200, 200', 200", the information providing server 300, 300', 300", the display system 100 and the information providing method thereof according to an exemplary embodiment, when the personalization and/or aggregation function provided by the display apparatus 200, 200', 200" is used, a user can be automatically logged in through the reference recognition information extracted from the personal information of the existing information providing server 300, 300', 300" to which she/he has already subscribed, without any conventional login procedure such as the user authenticode input method of inputting the ID and the password. In result, the user can use the personalization function of the display apparatus 200, 200', 200" without cumbersome login procedures of inputting the ID and the password whenever using the personalization and/or aggregation function.

Also, according to an exemplary embodiment, even if a user is misrecognized by the user recognition information obtained by the user recognizer 245 and the reference recognition information of the information providing server 300, 300', 300", she/he can differentially access to the personalization information in accordance with accuracy of user determination. In result, the user can easily use the personalization and/or aggregation function of the display apparatus 200, 200', 200" on the contrary to the conventional display apparatus that denies his/her access when she/he is misrecognized.

Also, according to an exemplary embodiment, when a single user uses the display apparatus 200, 200', 200" or a plurality of users simultaneously uses the display apparatus 200, 200', 200" it is possible to provide information optimized for the individual or the group even though the user is changed. In result, as compared with the conventional case that movement between user accounts is not free and the provided information is limited to the aggregation information of the fixed users using the joint accounts, it is possible to provide the optimized information to the individual or the group of users whenever the user is changed.

Also, according to an exemplary embodiment, the display apparatus 200, 200', 200" is provided with the apparatus authentication block 271, so that the display apparatus 200, 200', 200" by itself can subscribe to the information providing server 300, 300', 300" which may be realized by the SNS server and create a user account thereof. Accordingly, the display apparatus 200, 200', 200" can use various pieces of information or various functions with the information providing server 300, 300', 300". Also, users of, for example, mobile devices such as hand phones can not make the information sharing relation such as the 'friend' or the like with the display apparatus 200, 200', 200" to shares various pieces of information or various functions therewith based on the information sharing relation through the SNS of the information providing server 300, 300', 300".

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

The invention claimed is:

1. A display apparatus comprising:
a display;
communication circuitry configured to communicate with a server;
an input device configured to acquire recognition information about a plurality of current users, wherein the input device comprises at least one of a camera for receiving an image comprising a face image of a user, or a microphone for receiving sound of the user; and
a controller configured to:
identify a server user group comprising a plurality of server users corresponding to the plurality of current users based on the recognition information acquired via the input device;
identify a security classification of a server user having a highest matching accuracy from among a plurality of matching accuracies between the plurality of current users and the plurality of server users;
identify a service grade for the server user group based on the identified security classification; and
based on a request, by at least one of the plurality of current users, to the server for information related with the server user group being received, process the request based on the identified service grade.

2. The display apparatus according to claim 1, wherein the server comprises a social network service (SNS) providing server configured to allow information to be shared between server users and between the server users and the display apparatus.

3. The display apparatus according to claim 1, further comprising a storage,
wherein the controller is configured to control receiving reference recognition information from the server and store the received reference recognition information in the storage.

4. The display apparatus according to claim 1, wherein the matching accuracies comprise a matching rate between the acquired user recognition information and stored reference recognition information.

5. The display apparatus according to claim 4, wherein the identified service grade for the server user group comprises at least one of a definite server user corresponding to a matching rate equal to or higher than a first rate, or a general server user corresponding to a matching rate lower than the first rate.

6. The display apparatus according to claim 4, wherein the identified service grade for the server user group comprises at least one of a definite server user corresponding to a matching rate equal to or higher than a first rate, a reliable server user corresponding to a matching rate ranging from a second rate to the first rate, a potential server user corresponding to a matching rate ranging from a third rate to the second rate, or a general server user corresponding to a matching rate lower than the third rate.

7. The display apparatus according to claim 1, further comprising:
a storage configured to store a plurality of pieces of reference recognition information for the plurality of server users, wherein
the controller is configured to identify server users corresponding to pieces of reference recognition information for a plurality of current users acquired via the input device; control requesting, to the server, server information comprising personalization information of the identified server users; control receiving, from the server, server information; generate a group profile comprising profile information for differentiating access of a group of the plurality of current users to the received server information in accordance with authority of the identified server users; and control displaying requested information on the display, based on the generated group profile when one among the plurality of current users makes a request for the information.

8. The display apparatus according to claim 7, wherein the controller is configured to, based on a matching rate between the acquired user recognition information and the reference recognition information of a respective current user being equal to or higher than a first rate, identify the respective current user as the one of the plurality of server users.

9. The display apparatus according to claim 7, wherein the controller is configured to generate a group profile comprising profile information that further differentiates access of the group of the current users to the received server information of the server users in accordance with at least one of a user preference or a user characteristic.

10. The display apparatus according to claim 7, wherein the controller is configured to exclude personalization information comprising contents not available to any one of the current users, before the requested information is displayed on the display, based on the generated group profile.

11. The display apparatus according to claim 1, wherein the controller is configured to control receiving, from the server, personalization information searched by the server based on personalization data of the server users, or server information comprising at least one of an individual profile or a group profile, comprising profile information of the server users generated based on the searched personalization information.

12. An information providing method of a display apparatus, the method comprising:
acquiring recognition information about a plurality of current users, wherein the acquiring comprises acquiring at least one of image data comprising a face image of the user, or sound data comprising sound of the user;
identifying a server user group comprising a plurality of server users corresponding to the plurality of current users based on the acquired recognition information;
identifying a security classification of a server user having a highest matching accuracy from among a plurality of matching accuracies between the plurality of current users and the plurality of server users;
identifying a service grade for the server user group based on the identified security classification; and
based on a request, by at least one of the plurality of current users, to the server for information related with the server user group being received, processing the request based on the identified service grade.

13. The information providing method of the display apparatus according to claim 12, further comprising:
receiving reference recognition information from the server; and
storing the reference recognition information.

14. The information providing method of the display apparatus according to claim 13, wherein the matching accuracies comprise a matching rate between the acquired user recognition information and the reference recognition information.

15. The information providing method of the display apparatus according to claim 14, wherein the service grade for the server user group comprises at least one of a definite server user based on a matching rate equal to or higher than a first rate, or a general server user based on a matching rate lower than the first rate.

16. The information providing method of the display apparatus according to claim 14, wherein the service grade for the server user group comprises at least one of a definite server user based on a the matching rate equal to or higher than a first rate, a reliable server user based on a matching rate ranging from a second rate to the first rate, a potential server user based on a matching rate ranging from a third rate to the second rate, or a general server user based on a matching rate lower than the third rate.

17. The information providing method of the display apparatus according to claim 12, further comprising
storing a plurality of pieces of reference recognition information usable for identifying whether the plurality of current users about which the recognition information is acquired are respectively server users related to the display apparatus; and
identifying server users corresponding to the plurality of current users by comparing the acquired recognition information of the plurality of current users and the stored reference recognition information;
requesting, to the server, server information comprising personalization information of the server users;
receiving, from the server, the server information of the server users;
generating a group profile comprising profile information for differentiating access of a group of the plurality of current users to the received server information in accordance with authority of the identified server users; and
displaying requested information on the display based on the generated group profile when one among the plurality of current users makes a request for the information.

18. The information providing method of the display apparatus according to claim 17, wherein the identifying further comprises identifying a respective user as the one of the plurality of server users based on a matching rate between the acquired user recognition information and the reference recognition information being equal to or higher than a first rate.

19. The information providing method of the display apparatus according to claim 17, wherein the receiving comprises receiving one of the personalization information searched by the server based on the personalization data of the server users, and at least one of an individual profile or a group profile, comprising the profile information of the server users generated based on the personalization information.

20. A server comprising:
communication circuitry configured to communicate with a display apparatus;
a storage configured to store reference recognition information for a plurality of server users; and
a controller configured to:
provide a social network service (SNS) allowing information to be shared between server users and between the server users and the display apparatus;
identify a server user group comprising a plurality of server users corresponding to a plurality of current users of the display apparatus based on recognition information on the plurality of current users of the display apparatus received from the display apparatus through the communication circuitry, wherein the received recognition information comprises, for each respective current user, at least one of image data comprising a face image of the respective user acquired using a camera, or sound data comprising sound of the respective user acquired using a microphone;

identify a security classification of a server user having a highest matching accuracy from among a plurality of matching accuracies between the plurality of current users and the plurality of server users;
identify a service grade for the server user group based on the identified security classification;
generate server information comprising personalization information, which is related to the identified service grade; and
control transmitting the generated server information to the display apparatus through the communication circuitry.

* * * * *